US010574423B2

(12) United States Patent
Siomina et al.

(10) Patent No.: US 10,574,423 B2
(45) Date of Patent: Feb. 25, 2020

(54) METHODS AND APPARATUS FOR CONTROLLING INTERRUPTION LEVEL WITH RSSI-BASED MEASUREMENTS

(71) Applicant: Telefonaktiebolaget LM Ericsson (publ), Stockholm (SE)

(72) Inventors: Iana Siomina, Täby (SE); Muhammad Kazmi, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/998,912

(22) PCT Filed: Jan. 26, 2017

(86) PCT No.: PCT/SE2017/050068
§ 371 (c)(1),
(2) Date: Aug. 16, 2018

(87) PCT Pub. No.: WO2017/142454
PCT Pub. Date: Aug. 24, 2017

(65) Prior Publication Data
US 2019/0149307 A1     May 16, 2019

Related U.S. Application Data

(60) Provisional application No. 62/295,939, filed on Feb. 16, 2016.

(51) Int. Cl.
*H04L 5/00* (2006.01)
*H04W 16/14* (2009.01)
(Continued)

(52) U.S. Cl.
CPC .......... *H04L 5/0091* (2013.01); *H04B 17/318* (2015.01); *H04L 5/001* (2013.01);
(Continued)

(58) Field of Classification Search
CPC ..... H04L 5/001; H04L 5/0053; H04L 5/0098; H04W 28/0236
See application file for complete search history.

(56) References Cited

U.S. PATENT DOCUMENTS

2014/0112282 A1* 4/2014 Wijting ................ H04L 5/0098
370/329
2015/0230112 A1   8/2015 Siomina et al.
2017/0013630 A1* 1/2017 Franz .................... H04L 5/001

FOREIGN PATENT DOCUMENTS

WO    WO-2014025302 A1 *  2/2014  ........ H04W 52/0229

OTHER PUBLICATIONS

ETSI TS 136 214 v11.1.0; Technical Specification; LTE; Evolved Universal Terrestrial Radio Access (E-UTRA); Physical layer; Measurements (3GPP TS 36.214 version 11.1.0 Release 11)—Feb. 2013.
(Continued)

*Primary Examiner* — Pao Sinkantarakorn
(74) *Attorney, Agent, or Firm* — Sage Patent Group

(57) ABSTRACT

A method in a wireless device (410) is disclosed. The method comprises determining (704) a carrier aggregation configuration for the wireless device, and obtaining (708), based on the determined carrier aggregation configuration for the wireless device, an allowed interruption level on a first carrier frequency (505*a*, 505*b*, 605). The method comprises receiving (712), from a network node (415), a Received Signal Strength Indicator (RSSI) configuration for an RSSI-based measurement on one of the first carrier frequency and a second carrier frequency (510*a*, 510*b*, 610). The method comprises controlling (716) one or more configuration parameters to control an amount of interruption on the first carrier frequency to meet the obtained allowed interruption level.

17 Claims, 17 Drawing Sheets

(51) Int. Cl.
    *H04B 17/318* (2015.01)
    *H04L 27/00* (2006.01)
(52) U.S. Cl.
    CPC .......... *H04L 5/0053* (2013.01); *H04L 5/0098* (2013.01); *H04W 16/14* (2013.01); *H04L 5/0055* (2013.01); *H04L 5/0057* (2013.01); *H04L 27/0006* (2013.01)

(56) References Cited

OTHER PUBLICATIONS

3GPP TSG RAN WG1 Meeting #83; Anaheim, USA; Source: NTT Docomo, Inc.; Title: Discussion on inter-frequency RSSI measurement for LAA (R1-157222)—Nov. 15-22, 2015.

3GPP TSG-RAN WG2#91bis; Malmo, Sweden; Source: Motorola Mobility; Title: RSSI measurement for LAA (R2-154755)—Oct. 5-9.

3GPP TSG-RAN WG4 Meeting #77; Anaheim, CA, USA; Change Request; Title: LAA measurement requirements; Source to WG: Ericsson; Source to TSG: RAN WG4 (R4-158388)—Nov. 16-20, 2015.

PCT International Search Report for International application No. PCT/SE2017/050068—dated Mar. 28, 2017.

PCT Written Opinion of the International Searching Authority for International application No. PCT/SE2017/050068—dated Mar. 28, 2017.

3GPP TSG-RAN WG4 Meeting #78; St. Julian's, Malta; Change Request; Title: Modification on the SCell activation delay requirement for deactivated SCell under Frame Structure 3; Source to WG: Huawei, HiSilicon, Qualcomm, Ericsson; Source to TSG: R4 (R4-161441)—Feb. 15-19, 2016.

* cited by examiner

METHODS AND APPARATUS FOR CONTROLLING INTERRUPTION LEVEL WITH RSSI-BASED MEASUREMENTS

PRIORITY

This nonprovisional application is a U.S. National Stage Filing under 35 U.S.C. § 371 of International Patent Application Serial No. PCT/SE2017/050068 filed Jan. 26, 2017 and entitled "Methods and Apparatus for Controlling Interruption Level with RSSI-Based Measurements" which claims priority to U.S. Provisional Patent Application No. 62/295,939 filed Feb. 16, 2016 both of which are hereby incorporated by reference in their entirety.

TECHNICAL FIELD

The present disclosure relates, in general, to wireless communications and, more particularly, to methods for controlling interruption level with RSSI-based measurements.

BACKGROUND

In multi-carrier or carrier aggregation (CA) operation, a user equipment (UE) is able to receive and/or transmit data to more than one serving cell. In other words, a CA capable UE can be configured to operate with more than one serving cell. The carrier of each serving cell is generally referred to as a component carrier (CC). In general, CC refers to an individual carrier in a multi-carrier system. As used herein, CA may be interchangeably referred to as "multi-carrier system," "multi-cell operation," "multi-carrier operation," "multi-carrier" transmission and/or reception. This means CA may be used for transmission of signaling and data in the uplink (UL) and downlink (DL) directions. One of the CCs is the primary component carrier (PCC) or simply "primary carrier" or even "anchor carrier." The remaining CCs are referred to as secondary component carrier (SCC) or simply "secondary carriers" or even "supplementary carriers." The serving cell may be interchangeably referred to as the primary cell (PCell) or primary serving cell (PSC). Similarly, the secondary serving cell may be interchangeably referred to as the secondary cell (SCell) or secondary serving cell (SSC).

Generally, the primary or anchor CC carries the essential UE specific signaling. The primary CC (also known as PCC or PCell) exists in both UL and DL directions in CA. If there is a single UL CC, the PCell is on that CC. The network may assign different primary carriers to different UEs operating in the same sector or cell.

As used herein, multi-carrier SCell setup refers to a procedure that enables a network node to at least temporarily setup or release the use of an SCell in DL and/or UL by the CA capable UE. The SCell setup or release procedure or command can perform any one or more of the following: configuration of SCell(s) (also known as SCell addition); de-configuration of SCell(s) (also known as SCell release); activation of SCell(s); and deactivation of SCell(s)

A configuration procedure (i.e., addition and/or release of SCell(s)) is used by the serving radio network node (e.g., an eNode B (eNB) in Long Term Evolution (LTE) or Node B and/or radio network controller (RNC) in High Speed Packet Access (HSPA)) to configure a CA capable UE with one or more SCells (e.g., DL SCell, UL SCell or both). A de-configuration procedure, on the other hand, is used by the eNB to de-configure or remove one or more already configured SCells (e.g., DL SCell, UL SCell or both). The configuration or de-configuration procedures are also used to change the current multi-carrier configuration (e.g., for increasing or decreasing the number of SCells or for swapping the existing SCell(s) with new one(s)). Configuration and de-configuration is done by the network node (e.g., eNB) and by RNC using Radio Resource Control (RRC) signaling in LTE and HSPA, respectively.

The serving radio network node (e.g., eNB in LTE or Node B in HSPA) can activate one or more deactivated SCells or deactivate one or more SCells on the corresponding configured secondary carriers. The PCell is always activated. The configured SCells are initially deactivated upon addition and after a cell change (e.g., handover). In HSPA, the activation and deactivation command is sent by the Node B via the High-Speed Shared Control Channel (HS-SCCH). In LTE, the activation and deactivation command is sent by the eNB via a Medium Access Control (MAC) control element (MAC-CE). The deactivation of SCell saves UE battery power.

A SCell setup or release (i.e., when SCell is configured, de-configured, activated or deactivated) may cause a glitch or interruption of operation (e.g., reception and/or transmission on signals) on the PCell or any other activated SCell. The glitch or interruption in UL and/or DL typically occurs when the UE has a single radio chain to receive and/or transmit more than one CC. The glitch or interruption, however, may also occur when the UE has independent radio chains on the same chip. The glitch or interruption mainly occurs when the CA capable UE changes its reception and/or transmission bandwidth from single-carrier to multiple-carrier operation (or vice versa). In order to change the bandwidth, the UE has to reconfigure its radio frequency (RF) components in the RF chain (e.g., RF filter, power amplifier (PA), etc.). The glitch or interruption can vary between 2-5 ms. The interruption is due to several factors, including RF tuning to reconfigure bandwidth (e.g., shorten or extend), setting or adjusting of radio parameter(s) (e.g., Automatic Gain Control (AGC) setting), and other factors.

According to existing approaches, an interruption on PCell of up to 5 subframes is allowed for intra-band CA when any of the SCell setup or release procedures are executed by the UE. An interruption on PCell of up to 1 subframe is allowed, however, for inter-band CA when any of the SCell setup or release procedures are executed by the UE. When multiple SCCs are configured, then this requirement extends to the PCell and any activated SCell.

During the interruption period, the UE is unable to perform certain functions. For example, during the interruption period the UE cannot receive from and/or transmit any signal or information to the network. As another example, during the interruption the UE cannot perform measurements due to its inability to receive and/or transmit signals. This leads to the loss or dropping of packets transmitted between the UE and its serving cell(s). The interruption may impact several or all active carriers, and may affect both the UL and DL.

The UE may perform measurements on deactivated SCell(s) or other cells on the SCC with deactivated SCell. In such a case, the measurements are performed in measurement cycles configured by higher layers. The Positioning Reference Signal (PRS) configuration for Reference Signal Time Difference (RSTD) and SCell measurement cycle used for mobility measurements (e.g., Reference Signal Received Power (RSRP) and Reference Signal Received Quality (RSRQ)) are examples of measurement cycles. The SCell measurement cycles may have a periodicity of 160 ms, 320 ms, 640 ms or 1024 ms. The maximum time of a measurement within each measurement cycle is currently not restricted by the standard, but in practice it is likely to be up to 6 subframes in each cycle.

FIG. 1 illustrates interruption on PCC due to measurements on one or more cells of SCC with deactivated SCell. More particularly, FIG. 1 illustrates time 105 on the X-axis, interruptions on PCC 110a, 110b, and measurement sample 115. When performing measurement 115 on cells of the SCC with deactivated SCell(s) without gaps, the UE typically retunes its receiver. The cells may, for example, be SCell and/or one or more neighbor cells of that SCC. Therefore, interruptions 110a and 110b in DL and/or UL of the serving cell occur before and after each measurement sample 115 (i.e., when the bandwidth is extended (e.g., from 20 MHz to 40 MHz)) and also when it is reverted back to the bandwidth of the serving carriers (e.g., from 40 MHz to 20 MHz). Interruptions 110 may also occur when the serving carrier and the SCC are on the same chip. Interruptions 110 in each direction in this case can be between 2-5 ms because the UE has to retune the center frequency and the bandwidth of the DL. The UE does measurements on cells of SCC with deactivated SCell(s) on a regular basis according to the SCell measurement cycle configured by the network node (e.g., eNB).

The current requirement on the maximum allowed interruptions due to measurements on SCC with deactivated SCell is up to 0.5% probability of missed Acknowledgement (ACK)/Negative Acknowledgement (NACK) when the configured measCycleSCell (as described in 3GPP TS 36.331, v.13.0.0) is 640 ms or longer. Furthermore, when multiple SCCs are configured, there is also a requirement that an interruption on any activated SCell should not exceed 0.5% probability of missed ACK/NACK when the configured measCycleSCell for the deactivated SCell is 640 ms or longer.

In LTE, the UE may also perform discovery signal measurements. Examples of measurements that can be performed by the UE on discovery signals include cell search (also known as cell identification), RSRP, RSRQ, Channel State Information (CSI), CSI-RSRP, CSI-RSRQ, Channel Quality Indicators (CQI), UE Receive-Transmit (Rx-Tx) time difference, Signal to Interference plus Noise Ratio (SINR), Discovery Reference Signal-SINR (DRS-SINR), and other measurements. Examples of discovery signals include Primary Synchronization Sequence (PSS), Secondary Synchronization Sequence (SSS), common reference symbols (CRS), channel state information reference symbols (CSI-RS), PRS, and other discovery signals.

The discovery signals can be transmitted in a cell in a discovery occasion with some periodicity (also known as discovery occasion periodicity) as part of a discovery measurement configuration (also known as discovery signal measurement configuration). The discovery occasion may contain a certain number of subframes with discovery signals (e.g., between 1-6 subframes). Examples of discovery occasion periodicity include 40 ms, 80 ms and 160 ms. The DRS occasion may also be referred to as discovery signal occasion, discovery signal transmission occasion, and discovery occasion reference signal occasion. The DRS occasion comprises one or more time resources. Examples of time resources include time slot, subframe, symbol, frame, transmission time interval (TTI), interleaving time, and other time resources.

In some cases, the discovery measurement configuration is signalled to the UE via RRC for enabling the UE to perform measurements on cells of one or more carriers (e.g., PCC, SCC, PSC, inter-frequency carrier, etc.). The information element (IE) MeasDS-Config specifies information applicable for discovery signals measurement. The signalled IE is shown below:

| MeasDS-Config information elements | |
|---|---|
| -- ASN1START | |
| MeasDS-Config-r12 ::= | CHOICE { |
|   release | NULL, |
|   setup | SEQUENCE { |
|     dmtc-PeriodOffset-r12 | CHOICE { |
|       ms40-r12 | INTEGER(0..39), |
|       ms80-r12 | INTEGER(0..79), |
|       ms160-r12 | INTEGER(0..159), |
|       ... | |
|     }, | |
|     ds-OccasionDuration-r12 | CHOICE { |
|       durationFDD-r12 | INTEGER(1..maxDS-Duration-r12), |
|       durationTDD-r12 | INTEGER(2..maxDS-Duration-r12) |

The UE sets up the discovery signals measurement timing configuration (DMTC) in accordance with the received dmtc-PeriodOffset. The first subframe of each DMTC occasion occurs at a System Frame Number (SFN) and subframe of the PCell meeting the following conditions: (1) SFN mod T=FLOOR(dmtc-Offset/10); (2) subframe=dmtc-Offset mod 10; and (3) with T=dmtc-Periodicity/10.

Licensed-Assisted Access (LAA), or operation based on frame structure type 3 (specified in 3GPP TS 36.211, v.13.0.0), was introduced in LTE Release 13. It refers to UE operation on at least one carrier in non-licensed spectrum (such as Band 46 also used for WiFi access). For example, a UE can be configured with CA with PCell in Band 1 (licensed spectrum) and SCell in Band 46 (unlicensed spectrum). A network node (e.g., eNB) operating in the unlicensed band only transmits signals that may be used for UE measurements using so called discovery reference symbols (DRS). Unlike Release 8 common reference symbols (CRS), DRS is not transmitted in every subframe. Instead, DRS is transmitted periodically (e.g., every 160 ms). Moreover, the network node may perform so called listen-before-talk (LBT) procedures to check that no other unlicensed node (such as a WiFi access point) is transmitting before it transmits DRS. This means that from a UE perspective, the network node may be unable to transmit any particular DRS transmission. In certain regions, LBT functionality is required from a regulatory point of view to ensure fair coexistence of different radios and access technologies on the unlicensed band.

Examples of LAA measurements in Release 13 include: CRS-based measurements (e.g., RSRP, RSRQ); CSI-based measurements (e.g., CSI-RSRP); UE Received Signal Strength Indicator (RSSI); channel occupancy; cell detection; CSI; PMI; and CQI.

There are three types of RSSI in E-UTRA: (1) non-reportable RSSI used for RSRQ measurements; (2) reportable UE RSSI used for LAA; and (3) eNB RSSI used for LAA. The UE-reportable RSSI used for LAA is specified in 3GPP TS 36.214, v13.0.0, as shown below:

```
MeasResultForRSSI-r13 ::=      SEQUENCE {
    rssi-Result-r13                RSSI-Range-r13,
    channelOccupancy-r13           INTEGER (0..100)
}
```

| | |
|---|---|
| Definition | E-UTRA Received Signal Strength Indicator (RSSI), comprises the linear average of the total received power (in [W]) observed only in the configured OFDM symbols and in the measurement bandwidth over N number of resource blocks, by the UE from all sources, including co-channel serving and non-serving cells, adjacent channel interference, thermal noise etc. Higher layers indicate the measurement duration and which OFDM symbol(s) should be measured by the UE.<br>The reference point for the RSSI shall be the antenna connector of the UE.<br>If receiver diversity is in use by the UE, the reported value shall not be lower<br>than the corresponding RSSI of any of the individual diversity branches |
| Applicable for | RRC_CONNECTED intra-frequency,<br>RRC_CONNECTED inter-frequency |

FIG. 2 illustrates an example of UE-reportable RSSI measurement for LAA with the RSSI measurement duration of 70 ms. The UE physical layer shall be capable of performing such RSSI measurements on one or more carriers (if the carrier(s) are indicated by higher layers) and reporting the RSSI measurements to higher layers. The UE physical layer shall provide to higher layers a single RSSI sample for each OFDM symbol within each configured RSSI measurement duration occurring with a configured RSSI measurement timing configuration periodicity. The UE can report RSSI in the range of [−100 dBm, −25 dBm] with 1 dBm resolution, and can also report an indication when RSSI is less than −100 dBm or RSSI is greater than or equal to −25 dBm.

For this RSSI, the L1 (physical layer) averaging duration is pre-defined and it is one OFDM symbol. Further, this RSSI is configured by the following parameters (see also FIG. 2): periodicity of UE-reported RSSI measurement duration (also known as RSSI window periodicity) can have values of 40 ms, 80 ms, 160 ms, 320 ms, and 640 ms; measurement duration of UE-reported RSSI measurement (also known as RSSI window) is 1, 14, 28, 42, 70 (in unit of L1 averaging duration); and, optionally, a configurable subframe offset for inter-frequency measurement. When the subframe offset parameter is configured, the UE measures according to the configured offset. When the subframe offset parameter is not configured, the starting offset is chosen randomly by the UE.

The UE-reportable RSSI measurement is used for the channel occupancy measurement, which is a percentage of (per-symbol) samples when the RSSI was above the configured channelOccupancyThreshold for the associated reportConfig. The channel occupancy measurement is reported by the UE to an eNB via RRC, together with the RSSI:

According to 3GPP TS 36.331, v13.0.0:
if the measRSSI-ReportConfig is configured within the corresponding reportConfig for this measId:
2> set the rssi-Result to the average of sample value(s) provided by lower layers in the reportInterval;
2> set the channelOccupancy to the rounded percentage of sample values which are beyond to the channelOccupancyThreshold within all the sample values in the reportInterval;
where:

```
ReportInterval ::= ENUMERATED {ms120, ms240, ms480, ms640,
ms1024, ms2048, ms5120,
ms10240, min1, min6, min12, min30, min60, spare3, spare2, spare1}
```

The RSSI-based measurements are performed by the UE on one or more carriers during periodic time resources that are configured by the network via RRC signaling. The corresponding measurement configuration is referred to herein as RSSI measurement configuration or simply RSSI configuration. Therefore, both RSSI and channel occupancy measurements are performed by the UE in resources configured according to the RSSI configuration. The corresponding IE is expressed below:

```
MeasRSSI-Config-r13 ::=   CHOICE {
    release                   NULL,
    setup                     SEQUENCE {
        rmtc-Period-r13           ENUMERATED {ms40, ms80, ms160, ms320, ms640},
        rmtc-SubframeOffset-r13   INTEGER(0..639)      OPTIONAL,  -- Need ON
        measDuration-r13          ENUMERATED {sym1, sym14, sym28, sym42, sym70}
    }
}
```

FIG. 3 illustrates positioning subframe allocation in time for a single cell. More particularly, the example of FIG. 3 illustrates a period of N subframes 305 that includes 6 consecutive subframes forming one positioning occasion 310. In LTE, the positioning node (also known as E-SMLC, SLP or location server) configures the UE to perform one or more positioning measurements. The positioning measurements are used by the UE or positioning node to determine the UE location. The positioning node communicates with the UE and eNodeB in LTE using LPP and LPPa protocols, respectively.

The Observed Time Difference of Arrival (OTDOA) positioning method makes use of the measured timing of DL signals received from multiple eNBs at the UE. For each (measured) neighbor cell, the UE measures RSTD, which is the relative timing difference between a neighbor cell and the reference cell. The RSTD is measured on cell-specific PRS. The PRS are transmitted in pre-defined positioning subframes grouped by several consecutive subframes ($N_{PRS}$), (i.e., one positioning occasion 310 as shown in the example of FIG. 3). Positioning occasion(s) 310 occur periodically with a certain periodicity 305 of N subframes (i.e., the time interval between two positioning occasions 310). The standardized periods N 305 are 160 ms, 320 ms, 640 ms, and 1280 ms. The number of consecutive subframes 310 may be 1, 2, 4, or 6.

Yet another example of positioning is Enhanced Cell Identity (E-CID). Examples of corresponding measurements include UE Rx-Tx time difference measurement, base station Rx-Tx time difference measurement, timing advance, and other corresponding measurements. These E-CID measurements are performed on CRS in DL and Sounding Reference Signal (SRS) in UL. The SRS is configured by the network at the UE, and is also known as SRS configuration, periodic SRS configuration, and periodic E-CID SRS configuration. To enable the UE and the base station to perform E-CID measurements, SRS are configured with periodic transmission at the UE.

There may be certain deficiencies associated with the existing approaches described above. For example, the current interruption requirements assume that the measurements on deactivated SCells are performed in measurement cycles. RSSI-based measurements, however, generally cannot be performed in measurement cycles due to, for example, shorter RSSI window periodicity and because the times at which the RSSI measurements are to be performed can be configured by the network, while the timing of measurements in measurement cycles are determined by the UE (for a measurement cycle periodicity configured by the network). Furthermore, the RSSI sample duration is 1 symbol, and the RSSI window can be quite small, for example 1 symbol (i.e., for 1 RSSI sample only). This can result in a lot of interruptions when the UE needs multiple RSSI samples. The problem becomes even more severe when there are multiple SCCs. Moreover, the RSSI measurements may also be impacted by interruptions due to SCC setup and/or release procedure(s) on another carrier, and the RSSI configuration is carrier-specific (not cell-specific), while existing interruption requirements are associated with the serving cell of the carrier.

SUMMARY

To address the foregoing problems with existing solutions, disclosed is a method in a wireless device. The method comprises determining a carrier aggregation configuration for the wireless device, and obtaining, based on the determined carrier aggregation configuration for the wireless device, an allowed interruption level on a first carrier frequency. The method comprises receiving, from a network node, a Received Signal Strength Indicator (RSSI) configuration for an RSSI-based measurement on one of the first carrier frequency and a second carrier frequency. The method comprises controlling one or more configuration parameters to control an amount of interruption on the first carrier frequency to meet the obtained allowed interruption level.

In certain embodiments, the carrier aggregation configuration may comprise one or more of: a set of component carriers; a set of serving cells; an activation status of one or more serving cells; a deactivation status of one or more serving cells; a measurement cycle configuration; a system bandwidth on a component carrier; a measurement bandwidth on the component carrier; and a type of carrier aggregation.

In certain embodiments, the obtained allowed interruption level on the first carrier frequency may be an allowed interruption level for an RSSI-based measurement on the first carrier frequency. The received RSSI configuration may be an RSSI configuration for the RSSI-based measurement on the first carrier frequency. Controlling one or more configuration parameters to control an amount of interruption to meet the obtained allowed interruption level may comprise controlling one or more of: at least one configuration parameter for a pattern-based measurement on the second carrier frequency; at least one RSSI configuration parameter for an RSSI-based measurement on the second carrier frequency; and at least one RSSI configuration parameter for the RSSI-based measurement on the first carrier frequency. In certain embodiments, the method may comprise one or more of sending, to another node, a result of the RSSI-based measurement on the first carrier frequency; and using the result of the RSSI-based measurement on the first carrier frequency for one or more operational tasks.

In certain embodiments, the received RSSI configuration may be an RSSI configuration for an RSSI-based measurement on the second carrier frequency. Controlling one or more configuration parameters to control an amount of interruption to meet the obtained allowed interruption level may comprise controlling one or more of: at least one configuration parameter for a pattern-based measurement on the first carrier frequency; and at least one RSSI configuration parameter for an RSSI-based measurement on the second carrier frequency.

In certain embodiments, the method may comprise indicating, to another node, an experienced interruption level at the wireless device. The experienced interruption level at the wireless device may comprise one or more of: an experienced interruption level at the wireless device during the RSSI-based measurement on the first carrier frequency; and an experienced interruption level on the first carrier frequency at the wireless device due to the RSSI-based measurement on the second carrier frequency.

In certain embodiments, the controlled one or more configuration parameters may comprise one or more of: a time offset delta between an RSSI window on the first carrier frequency and a measurement occasion on the second carrier frequency; a time offset delta between an RSSI window on the second carrier frequency and a measurement occasion on the first carrier frequency; a measurement cycle configuration parameter; an activation status of one or more serving cells; a deactivation status of one or more serving cells; a carrier aggregation configuration parameter; a positioning reference signal (PRS) configuration parameter; a discovery signal measurement configuration parameter; and a sounding reference signal (SRS) configuration parameter.

In certain embodiments, the first carrier frequency may comprise one of a primary component carrier and an activated secondary component carrier; and the second carrier frequency may comprise a deactivated secondary component carrier. The RSSI-based measurement may comprise one of an RSSI measurement and a channel occupancy measurement. In certain embodiments, at least the second carrier frequency may be comprised in unlicensed spectrum.

Also disclosed is a wireless device. The wireless device comprises processing circuitry. The processing circuitry is configured to determine a carrier aggregation configuration for the wireless device. The processing circuitry is configured to obtain, based on the determined carrier aggregation configuration for the wireless device, an allowed interruption level on a first carrier frequency. The processing circuitry is configured to receive, from a network node, a Received Signal Strength Indicator (RSSI) configuration for an RSSI-based measurement on one of the first carrier frequency and a second carrier frequency. The processing circuitry is configured to control one or more configuration parameters to control an amount of interruption on the first carrier frequency to meet the obtained allowed interruption level.

Also disclosed is a method in a network node. The method comprises determining a carrier aggregation configuration for a wireless device, and obtaining, based on the determined carrier aggregation configuration, an allowed interruption level on a first carrier frequency. The method comprises controlling, for the wireless device, one or more configuration parameters to control an amount of interruption on the first carrier frequency to meet the obtained allowed interruption level. The method comprises configuring, based on the controlled one or more configuration parameters, the wireless device with a Received Signal Strength Indicator (RSSI)-based measurement on one of the first carrier frequency and a second carrier frequency, and at least one other measurement.

In certain embodiments, the obtained allowed interruption level on the first carrier frequency may be an allowed interruption level for an RSSI-based measurement on the first carrier frequency. The controlled one or more configuration parameters may comprise one or more of: at least one configuration parameter for a pattern-based measurement on the second carrier frequency; at least one RSSI configuration parameter for an RSSI-based measurement on the second carrier frequency; and at least one RSSI configuration parameter for the RSSI-based measurement on the first carrier frequency. The configured RSSI-based measurement may be the RSSI-based measurement on the first carrier frequency. The configured at least one other measurement may be one of: the pattern-based measurement on the second carrier frequency; and the RSSI-based measurement on the second carrier frequency.

In certain embodiments, the controlled one or more configuration parameters may comprise one or more of: at least one configuration parameter for a pattern-based measurement on the first carrier frequency; and at least one RSSI configuration parameter for an RSSI-based measurement on the second carrier frequency. The configured RSSI-based measurement may be an RSSI-based measurement on the second carrier frequency. The configured at least one other measurement may be the pattern-based measurement on the first carrier frequency.

In certain embodiments, the method may comprise sending, to the wireless device, a parameter related to the obtained allowed interruption level to allow the wireless device to further control the interruption level. In certain embodiments, the first carrier frequency may comprise one of a primary component carrier and an activated secondary component carrier; and the second carrier frequency may comprise a deactivated secondary component carrier.

In certain embodiments, the controlled one or more configuration parameters may comprise one or more of: a time offset delta between an RSSI window on the first carrier frequency and a measurement occasion on the second carrier frequency; a time offset delta between an RSSI window on the second carrier frequency and a measurement occasion on the first carrier frequency; a measurement cycle configuration parameter; an activation status of one or more serving cells; a deactivation status of one or more serving cells; a carrier aggregation configuration parameter; a positioning reference signal (PRS) configuration parameter; a discovery signal measurement configuration parameter; and a sounding reference signal (SRS) configuration parameter.

Also disclosed is a network node. The network node comprises processing circuitry. The processing circuitry is configured to determine a carrier aggregation configuration for a wireless device. The processing circuitry is configured to obtain, based on the determined carrier aggregation configuration, an allowed interruption level on a first carrier frequency. The processing circuitry is configured to control, for the wireless device, one or more configuration parameters to control an amount of interruption on the first carrier frequency to meet the obtained allowed interruption level. The processing circuitry is configured to configure, based on the controlled one or more configuration parameters, the wireless device with a Received Signal Strength Indicator (RSSI)-based measurement on one of the first carrier frequency and a second carrier frequency, and at least one other measurement.

Certain embodiments of the present disclosure may provide one or more technical advantages. For example, certain embodiments may allow the possibility to control and reduce the amount of interruption on a first carrier frequency due to RSSI-based measurements on a second carrier frequency. As another example, certain embodiments may enable the wireless device to perform similar measurements on different carriers in CA around the same time (e.g., within a certain time window). This in turn saves battery power and also reduces implementation complexity of the wireless device. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
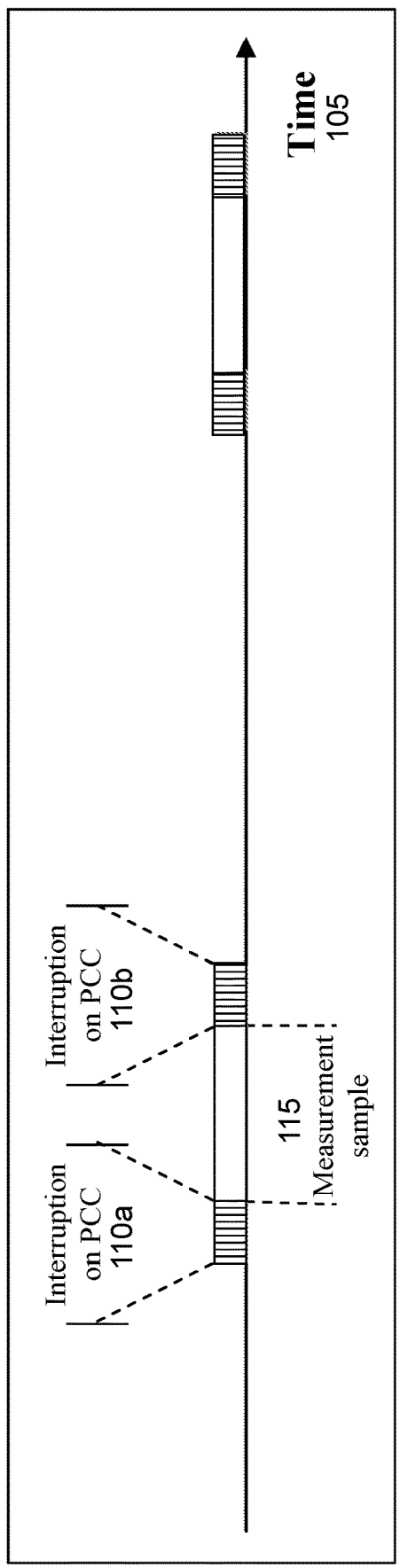
FIG. 1 illustrates interruption on PCC due to measurements on one or more cells of SCC with deactivated SCell.
Figure 2:
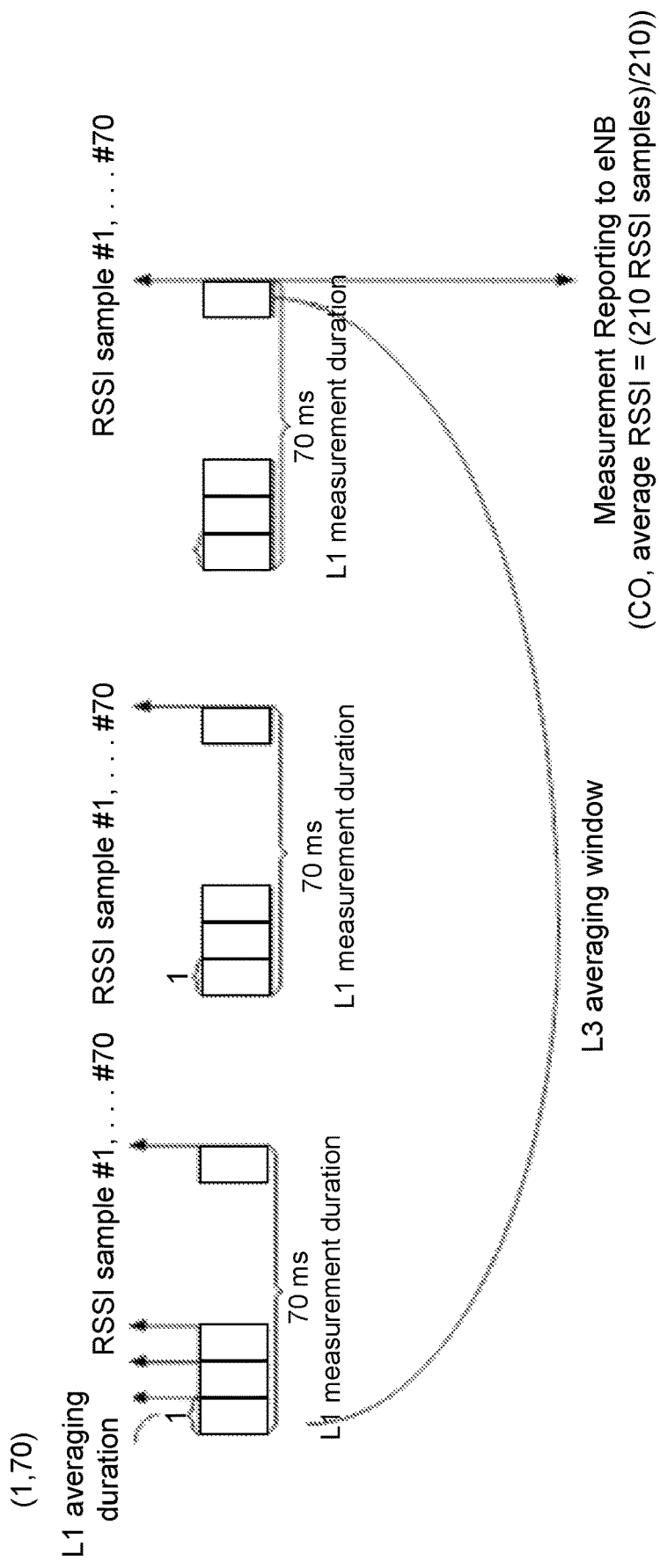
FIG. 2 illustrates an example of UE-reportable RSSI measurement for LAA with an RSSI measurement duration of 70 ms.
Figure 3:
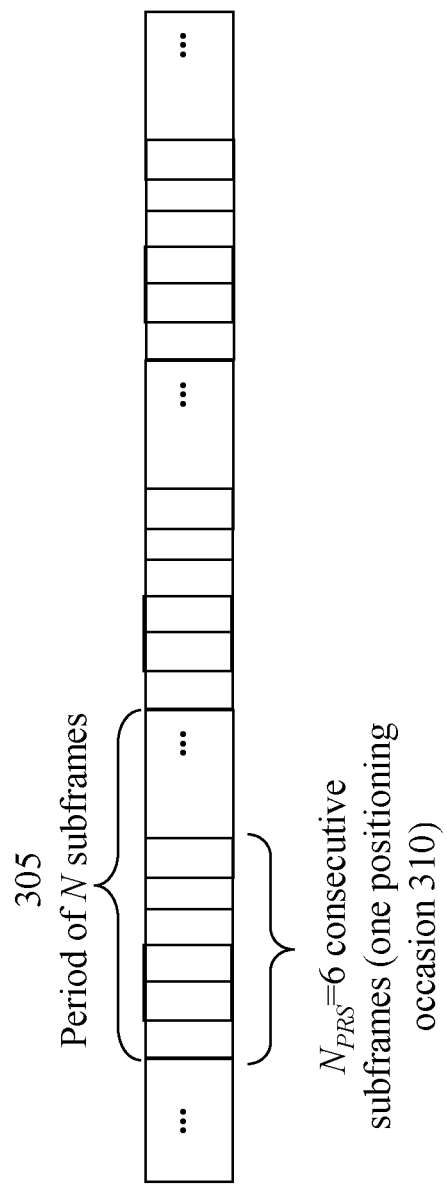
FIG. 3 illustrates positioning subframe allocation in time for a single cell.

RSSI is a new measurement configured independently of DMTC, and may cause additional interruptions. In some cases, interruptions to PCell and Active SCells may be allowed up to 0.5% probability of missed ACK/NACK, if any of the configured rmtc-Period and measCycleSCell is 640 ms or longer. In other cases, no interruptions may be allowed if rmtc-Period and measCycleSCell are below 640 ms. For multiple deactivated SCCs, RSSI windows on different SCCs are within 20 ms.

As described above, existing approaches may suffer from certain deficiencies. For example, the current interruption requirements assume that the measurements on deactivated SCells are performed in measurement cycles. RSSI-based measurements, however, generally cannot be performed in measurement cycles due to, for example, shorter RSSI window periodicity and because the times at which the RSSI measurements are to be performed can be configured by the network, while the timing of measurements in measurement cycles are determined by the wireless device (for a measurement cycle periodicity configured by the network). Furthermore, the RSSI sample duration is 1 symbol, and the RSSI window can be quite small, for example 1 symbol (i.e., for 1 RSSI sample only). This can result in a lot of interruptions when the wireless device needs multiple RSSI samples. The problem becomes even more severe when there are multiple SCCs. Moreover, the RSSI measurements may also be impacted by interruptions due to SCC setup and/or release procedure(s) on another carrier, and the RSSI configuration is carrier-specific (not cell-specific), while existing interruption requirements are associated with the serving cell of the carrier.

The present disclosure contemplates various embodiments that may address these and other deficiencies associated with existing approaches. According to one example embodiment, a method in a wireless device is disclosed. The wireless device determines a CA configuration for the wireless device, and obtains, based on the determined CA configuration for the wireless device, an allowed interruption level on a first carrier frequency. The CA configuration may include one or more of: a set of component carriers; a set of serving cells; an activation status of one or more serving cells; a deactivation status of one or more serving cells; a measurement cycle configuration; a system bandwidth on a component carrier; a measurement bandwidth on the component carrier; and a type of CA. The wireless device receives, from a network node, a RSSI configuration for an RSSI-based measurement on one of the first carrier frequency and a second carrier frequency. The RSSI-based measurement may be one of an RSSI measurement and a channel occupancy measurement. The first carrier frequency may be one of a primary component carrier and an activated secondary component carrier, and the second carrier frequency may be a deactivated secondary component carrier.

The wireless device controls one or more configuration parameters to control an amount of interruption on the first carrier frequency to meet the obtained allowed interruption level. The controlled one or more configuration parameters may be one or more of: a time offset delta between an RSSI window on the first carrier frequency and a measurement occasion on the second carrier frequency; a time offset delta between an RSSI window on the second carrier frequency and a measurement occasion on the first carrier frequency; a measurement cycle configuration parameter; an activation status of one or more serving cells; a deactivation status of one or more serving cells; a carrier aggregation configuration parameter; a PRS configuration parameter; a discovery signal measurement configuration parameter; and a SRS configuration parameter. The wireless device may indicate, to another node, an experienced interruption level at the wireless device.

According to another example embodiment, a method in a network node is disclosed. The network node determines a CA configuration for a wireless device, and obtains, based on the determined CA configuration, an allowed interruption level on a first carrier frequency. The CA configuration may include one or more of: a set of component carriers; a set of serving cells; an activation status of one or more serving cells; a deactivation status of one or more serving cells; a measurement cycle configuration; a system bandwidth on a component carrier; a measurement bandwidth on the component carrier; and a type of CA.

The network node controls, for the wireless device, one or more configuration parameters to control an amount of interruption on the first carrier frequency to meet the obtained allowed interruption level. The controlled one or more configuration parameters may be one or more of: a time offset delta between an RSSI window on the first carrier frequency and a measurement occasion on the second carrier frequency; a time offset delta between an RSSI window on the second carrier frequency and a measurement occasion on the first carrier frequency; a measurement cycle configuration parameter; an activation status of one or more serving cells; a deactivation status of one or more serving cells; a carrier aggregation configuration parameter; a positioning reference signal (PRS) configuration parameter; a discovery signal measurement configuration parameter; and a sounding reference signal (SRS) configuration parameter. The network node configures, based on the controlled one or more configuration parameters, the wireless device with a RSSI-based measurement on one of the first carrier frequency and a second carrier frequency, and at least one other measurement. The first carrier frequency may be one of a primary component carrier and an activated secondary component carrier, and the second carrier frequency may be a deactivated secondary component carrier. In certain embodiments, the network node may send, to the wireless device, a parameter related to the obtained allowed interruption level to allow the wireless device to further control the interruption level.

Certain embodiments of the present disclosure may provide one or more technical advantages. For example, certain embodiments may allow the possibility to control and reduce the amount of interruption on a first carrier frequency due to RSSI-based measurements on a second carrier frequency. As another example, certain embodiments may enable the wireless device to perform similar measurements on different carriers in CA around the same time (e.g., within a certain time window). This in turn saves battery power and also reduces implementation complexity of the wireless device. Other advantages may be readily apparent to one having skill in the art. Certain embodiments may have none, some, or all of the recited advantages.

Figure 4:
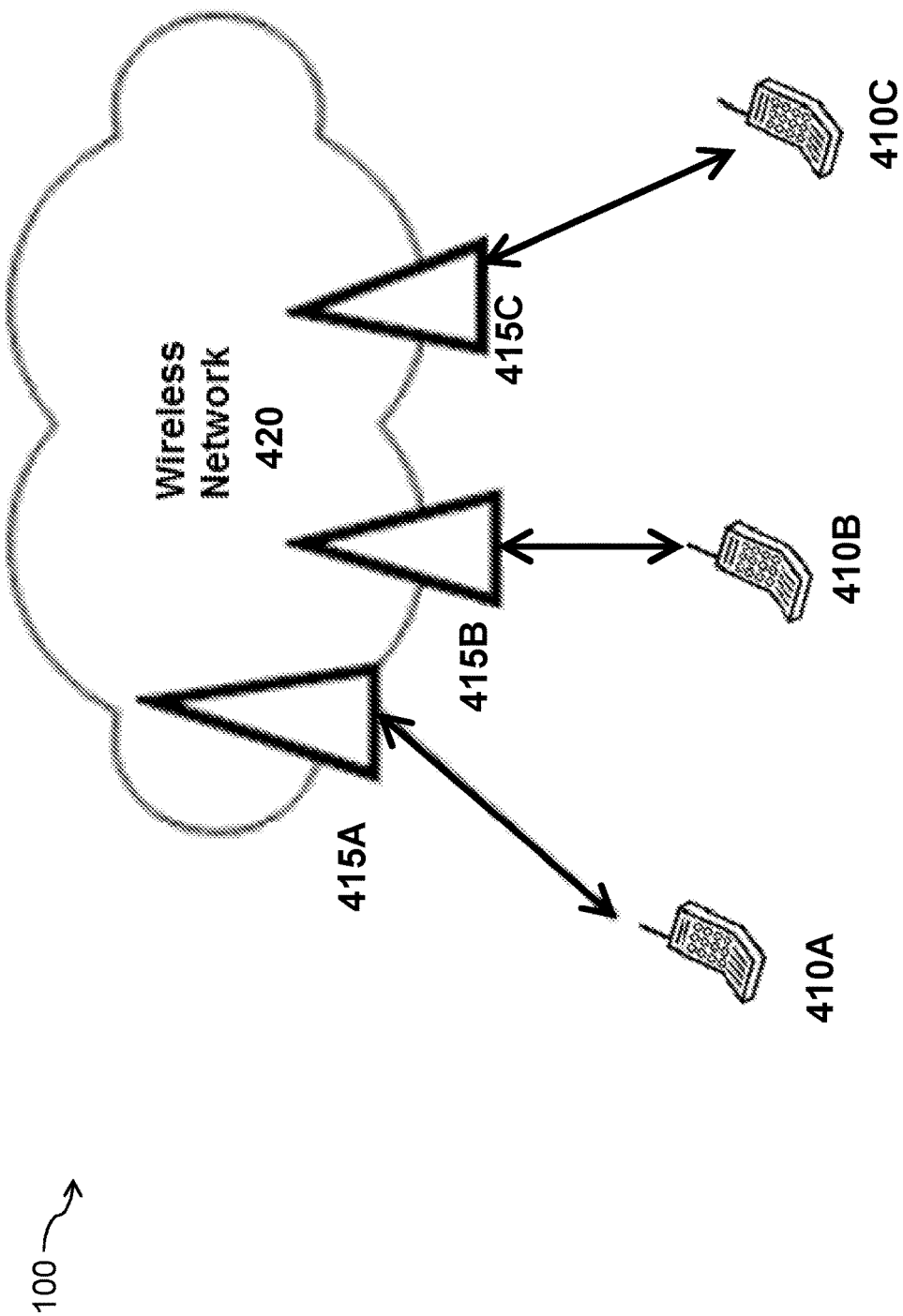
FIG. 4 is a schematic diagram of a wireless communication network, in accordance with certain embodiments.

FIG. 4 is a schematic diagram of a wireless communication network, in accordance with certain embodiments. Network 400 includes one or more UE(s) 410 (which may be interchangeably referred to as wireless devices 410 or simply device 410) and network node(s) 415 (which may be interchangeably referred to as eNBs 415 or base station (BS) 415). UEs 410 may communicate with network nodes 415 over a wireless interface. For example, UE 410A may transmit wireless signals to one or more of network nodes 415, and/or receive wireless signals from one or more of network nodes 415. The wireless signals may contain voice traffic, data traffic, control signals, and/or any other suitable information. In some embodiments, an area of wireless signal coverage associated with a network node 415 may be referred to as a cell. In some embodiments, UEs 410 may have D2D capability. Thus, UEs 410 may be able to receive signals from and/or transmit signals directly to another UE. For example, UE 410A may be able to receive signals from and/or transmit signals to UE 410B.

In certain embodiments, network nodes 415 may interface with a radio network controller. The radio network controller may control network nodes 415 and may provide certain radio resource management functions, mobility management functions, and/or other suitable functions. In certain embodiments, the functions of the radio network controller may be performed by network node 415. The radio network controller may interface with a core network node. In certain embodiments, the radio network controller may interface with the core network node via an interconnecting network 420. Interconnecting network 420 may refer to any interconnecting system capable of transmitting audio, video, signals, data, messages, or any combination of the preceding. Interconnecting network 420 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for UEs 410. UEs 410 may exchange certain signals with the core network node using the non-access stratum layer. In non-access stratum signaling, signals between UEs 410 and the core network node may be transparently passed through the radio access network. In certain embodiments, network nodes 415 may interface with one or more network nodes over an internode interface. For example, network nodes 415A and 415B may interface over an X2 interface.

In certain embodiments, the non-limiting term UE or wireless device is used. The UE herein can be any type of wireless device capable of communicating with a network node and/or with another UE over radio signals. Examples of UE include a radio communication device, target device, device-to-device (D2D) UE, machine type UE or UE capable of machine-to-machine (M2M) communication, a sensor/actuator equipped with UE, PDA, Tablet, mobile terminals, smart phone, laptop embedded equipped (LEE), laptop mounted equipment (LME), USB dongles, customer premises equipment (CPE), or any other suitable device.

Also in certain embodiments generic terminology "network node" is used. It can be any kind of network node which may comprise any type of radio network node or any network node that communicates with a UE and/or with another network node. Examples of network nodes include a Node B, BS, radio BS, multi-standard radio (MSR) radio node such as MSR BS, eNB, network controller, RNC, multi-cell/multicast coordination entity (MCE), base station controller (BSC), relay node, donor node controlling relay, base transceiver station (BTS), access point (AP), radio access point, transmission points, transmission nodes, remote radio unit (RRU), remote radio head (RRH), nodes in distributed antenna system (DAS), core network node (e.g. MSC, MME, SON node, coordinating node, etc.), O&M, OSS, positioning node (e.g. E-SMLC), MDT node, an external node (e.g., third-party node, a node external to the current network), or any other suitable network node.

The term "radio node" used herein may be used to denote a UE or a radio network node.

Example embodiments of UEs 410, network nodes 415, and other network nodes (such as radio network controller or core network node) are described in more detail with respect to FIGS. 13-17 below.

Any two or more embodiments described herein may be combined in any way with each other. Moreover, the embodiments are applicable to single carrier as well as to multi-carrier or CA operation of the UE in which the UE is able to receive and/or transmit data to more than one serving cells. CA may be interchangeably referred to as "multi-carrier system," "multi-cell operation," "multi-carrier operation," "multi-carrier" transmission and/or reception. In CA one of the CCs is the PCC or simply "primary carrier" or "anchor carrier." The remaining ones are called SCC or "secondary carriers" or "supplementary carriers." The serving cell may be interchangeably referred to as primary cell (PCell) or primary serving cell (PSC). Similarly the secondary serving cell may be interchangeably referred to as secondary cell (SCell) or secondary serving cell (SSC).

In Dual Connectivity (DC) operation, the UE can be served by at least two nodes called master eNB (MeNB) and secondary eNB (SeNB). More generally, in multiple connectivity (also known as multi-connectivity) operation the UE can be served by two or more nodes (e.g., MeNB, SeNB1, SeNB2 and so on). The UE is configured with PCC from both MeNB and SeNB. The PCell from MeNB and SeNB are called as PCell and PSCell, respectively. Typically, the PCell and PSCell operate the UE independently. The UE is also configured with one or more SCCs from each of MeNB and SeNB. The corresponding secondary serving cells served by MeNB and SeNB are called SCell. The UE in DC typically has separate TX/RX for each of the connections with MeNB and SeNB. This allows the MeNB and SeNB to independently configure the UE with one or more procedures (e.g., radio link monitoring (RLM), DRX cycle, etc.) on their PCell and PSCell respectively. The methods and embodiments described herein are applicable to both CA, DC and Multi-Connectivity (MC).

The term "signaling" as used herein may comprise, for example, any of: high-layer signaling (e.g., via RRC), lower-layer signaling (e.g., via a physical control channel or a broadcast channel), a combination thereof, or any other suitable type of signaling. The signaling may be implicit or explicit. The signaling may further be unicast, multicast or broadcast. The signaling may also be directly to another node or via a third node.

The term "conditions" as used herein in general refers to radio conditions. The radio conditions may be described, for example, by any one or more of: presence or absence (e.g., due to muting or LBT) of a certain signal or transmissions of a certain type or from a certain node, channel quality, Ês/Iot (e.g., as defined in 3GPP TS 36.133, v.13.2.0) where: Ês is the received energy per RE, power normalized to the subcarrier spacing, during the useful part of the symbol (i.e., excluding the cyclic prefix), at the UE antenna connector; Tot is the received power spectral density of the total noise and interference for a certain RE, power integrated over the RE and normalized to the subcarrier spacing, as measured at the UE antenna connector), signal to interference plus noise ratio (SINR), SIR (signal to interference ratio), SNR (signal to noise ratio), received signal quality, received signal strength, total interference or interference on specific time and/or frequency resources or from a specific interferer(s), RSRP, RSRQ, CSI-RSRP. An example of radio conditions corresponding to two different measurement periods: Es/Iot>=threshold1 and threshold1>Es/Iot>=threshold2.

The term DRS or discover (or discovery) signal may comprise of any type of reference signal, which can be used by the UE for performing one or more measurements. Examples of DRS include CRS, CSI-RS, PSS, SSS, MBSFN RS, etc. One or more DRS may be transmitted in the same DRS time resource. Examples of DRS time resource include symbol, subframe, slot, and other time resources.

The term "measurement" as used herein refers to radio measurements. Some examples of the radio measurements include: RSSI measurement (described above), channel occupancy measurement (described above), WiFi RSSI measurement, signal strength or signal power measurements (e.g., RSRP or CSI-RSRP), signal quality measurements (e.g., RSRQ, SINR), timing measurements (e.g., Rx-Tx, RSTD, RTT, TOA), radio link monitoring (RLM) measurements, CSI, PMI, cell detection, cell identification, number of successful reports, number of ACKs/NACKs, failure rate, error rate, among others. The measurements may be absolute or relative (e.g., absolute RSRP and relative RSRP). The measurements may be performed for one or more different purpose (e.g., RRM, SON, positioning, MDT, etc.). The measurements may be, for example, intra-frequency measurements, inter-frequency measurements, or CA measurements. The measurements may be performed in the licensed and/or unlicensed spectrum. Some examples of RSSI-based measurements include RSSI for LAA, channel occupancy measurement for LAA, WiFi RSSI, among others.

The term "measurement requirement" as used herein may comprise a requirement for any one or more measurements (see the term "measurement"), for example, maximum measurement time, minimum measurement accuracy, the amount of allowed interruptions, maximum reporting time, number of measured cells, etc.

Although FIG. 4 illustrates a particular arrangement of network 400, the present disclosure contemplates that the various embodiments described herein may be applied to a variety of networks having any suitable configuration. For example, network 400 may include any suitable number of UEs 410 and network nodes 415, as well as any additional elements suitable to support communication between UEs or between a UE and another communication device (such as a landline telephone). Although certain embodiments are described in the LAA context, the embodiments described herein are not limited to LAA. Furthermore, although certain embodiments may be described as implemented in a LTE network, the embodiments may be implemented in any appropriate type of telecommunication system supporting any suitable communication standards (including 5G) and using any suitable components, and are applicable to any radio access technology (RAT) or multi-RAT systems in which the UE receives and/or transmits signals (e.g., data). For example, the various embodiments described herein may be applicable to UTRA, LTE-Advanced, 5G, NX, Narrowband Internet-of-Things (NB-IoT), WiFi, BlueTooth, UMTS, HSPA, GSM, cdma2000, WiMax, another suitable radio access technology, or any suitable combination of one or more radio access technologies.

In certain embodiments, methods in a wireless device and methods in a network node are disclosed for controlling the impact of interruptions to RSSI-based measurements. Examples of these embodiments are described below with respect to FIG. 5.

Figure 5:
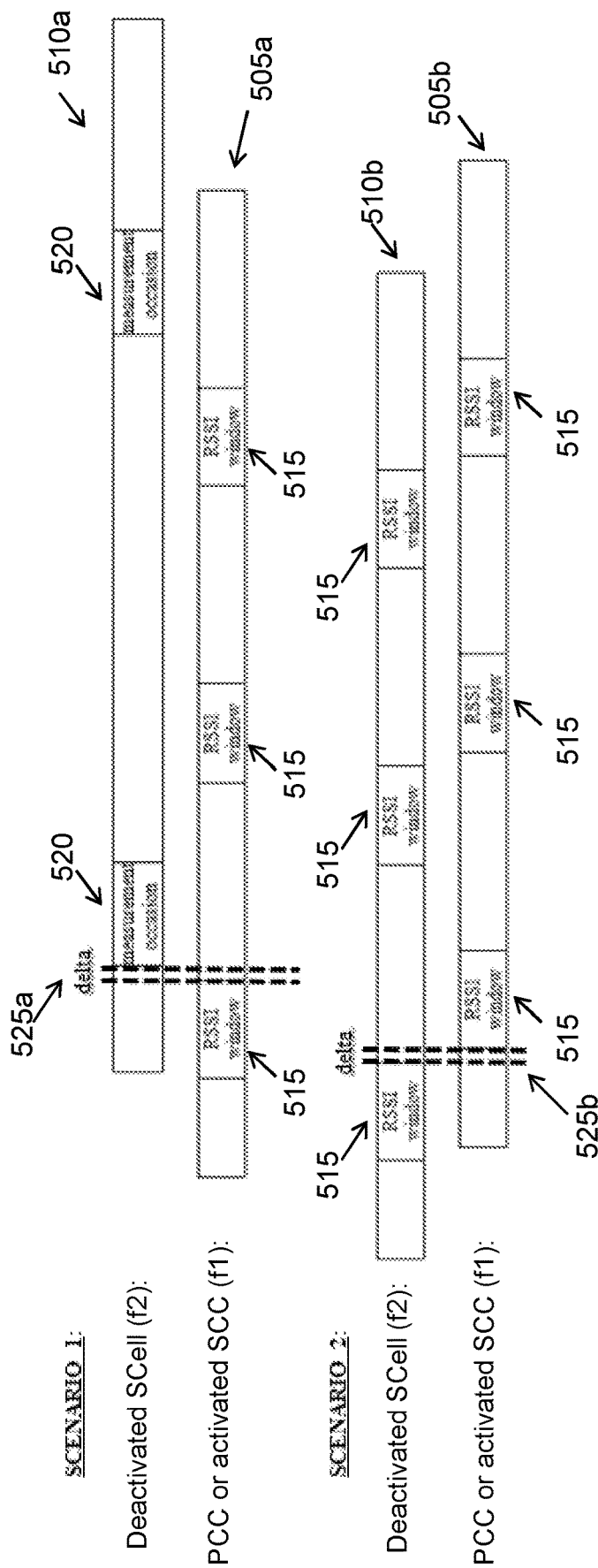
FIG. 5 illustrates two example scenarios in which methods for controlling the impact of interruptions to RSSI-based measurements may be applied, in accordance with certain embodiments.

FIG. 5 illustrates two example scenarios in which methods for controlling the impact of interruptions to RSSI-based measurements may be applied, in accordance with certain embodiments. More particularly, FIG. 5 illustrates two scenarios, Scenario 1 and Scenario 2. In Scenario 1, a PCC or activated SCC on a first carrier frequency 505a is illustrated together with a deactivated SCell on a second carrier frequency 510a. PCC or activated SCC on first carrier frequency 505a is shown with a plurality of RSSI windows 515. Deactivated SCell on the second carrier frequency 510a is shown with a plurality of measurement occasions 520. Some examples of measurement occasion include measurement cycle, a pattern-based measurement (e.g., RSTD for positioning, discovery signal measurements). A time offset delta 525a is shown as the period between the end of a first RSSI window 515 on PCC or activated SCC on first carrier frequency 505a and the beginning of a first measurement occasion 520 on deactivated SCell on second carrier frequency 510a.

With respect to Scenario 2, a PCC or activated SCC on first carrier frequency 505b is illustrated together with a deactivated SCell on second carrier frequency 510b. Each of PCC or activated SCC on first carrier frequency 505b and deactivated SCell on second carrier frequency 510b is shown with a plurality of RSSI windows 515. A time offset delta 525b is shown as the period between the end of a first RSSI window 515 on deactivated SCell on second carrier frequency 510b and the beginning of a first RSSI window 515 on PCC or activated SCC on first carrier frequency 505b.

In the description that follows, certain aspects of the various embodiments may be described as applicable to first carrier frequency 505a, 505b and second carrier frequency 510a, 510b. The various aspects described in this manner are equally applicable to both Scenario 1 and Scenario 2 illustrated in FIG. 5.

The methods in a wireless device and the methods in a network node for controlling the impact of interruptions to RSSI-based measurements described herein may apply, for example, in Scenario 1 and Scenario 2 shown in FIG. 5. As described above, according to one example embodiment, a method in a wireless device is disclosed. Examples of wireless devices are described above in relation to FIG. 4 and below in relation to FIGS. 13 and 16. The wireless device determines a carrier aggregation configuration for the wireless device, and obtains, based on the determined carrier aggregation configuration for the wireless device, an allowed interruption level on a first carrier frequency. The wireless device receives, from a network node, a RSSI configuration for an RSSI-based measurement on one of the first carrier frequency and a second carrier frequency. The wireless device controls one or more configuration parameters to control an amount of interruption on the first carrier frequency to meet the obtained allowed interruption level.

In certain embodiments, such as those applicable to Scenarios 1 and 2 illustrated in FIG. 5, the obtained allowed interruption level on first carrier frequency 505a, 505b may be an allowed interruption level for an RSSI-based measurement on first carrier frequency 505a, 505b. The received RSSI configuration may be an RSSI configuration for the RSSI-based measurement on first carrier frequency 505a, 505b. Controlling one or more configuration parameters to control an amount of interruption to meet the obtained allowed interruption level may comprise controlling one or more of: at least one configuration parameter for a pattern-based measurement on second carrier frequency 510a, 510b; at least one RSSI configuration parameter for an RSSI-based measurement on second carrier frequency 510a, 510b; and at least one RSSI configuration parameter for the RSSI-based measurement on first carrier frequency 505a, 505b. In certain embodiments, the wireless device may send, to another node, a result of the RSSI-based measurement on first carrier frequency 505a, 505b. In certain embodiments, the wireless device may use the result of the RSSI-based measurement on first carrier frequency 505a, 505b for one or more operational tasks.

As described above, in certain embodiments the wireless device determines a CA configuration for the wireless device. The wireless device may determine the wireless device's CA configuration in any suitable manner. In certain embodiments, the CA configuration may be determined based on, for example, one or more of: a configuration parameter received from a network node; information stored in the wireless device; a pre-defined CA aggregation configuration; a CA configuration obtained based on a pre-defined rule; and may be based on history. The CA configuration may be the current wireless device CA configuration or the CA configuration the wireless device is about to apply.

The CA configuration of the wireless device may have any suitable characteristics. For example, the CA configuration of the wireless device may include one or more of the following characteristics: a set of component carriers (e.g., PCC and one or more of SCCs in UL and DL) with associated carrier frequencies (e.g., absolute frequency channel number such as the EUTRA Absolute Radio-Frequency Channel Number (EARFCN) of the CC); a set of serving cells; a system bandwidth for one or more of the CCs or corresponding serving cells (PCell and SCells); a measurement bandwidth for one or more of the CCs or corresponding serving cells (PCell and SCells); an activation status of the CC (e.g., whether this is an SCC with deactivated SCell) or one or more serving cells; a deactivation status of the CC or one or more serving cells; a type of CA. Examples of CA type include inter-band CA, intra-band contiguous CA, intra-band non-contiguous CA, any combination thereof, and any other suitable carrier aggregation type.

The wireless device obtains, based on the determined carrier aggregation configuration for the wireless device, an allowed interruption level on first carrier frequency 505a, 505b. In certain embodiments, the obtained allowed interruption level on first carrier frequency 505a, 505b may be an allowed interruption level for an RSSI-based measurement on the first carrier frequency 505a, 505b.

The wireless device may obtain the allowed interruption level on first carrier frequency 505a, 505b in any suitable manner. In certain embodiments, for example, the obtaining may be based on one or more of: at least one parameter related to the level of interruption received from a network node (e.g., allowedInterruption in RRC); a pre-defined value; may be obtained based on a pre-defined rule; based on wireless device measurements; and any other suitable manner. Non-limiting examples of interruption levels include: a maximum allowed number of impacted subframes; RSSI samples or RSSI symbols; a maximum allowed interruption time; a X % probability of missed ACK/NACK; and any other suitable interruption levels.

In some cases, the allowed interruption level may be associated with the CA configuration of the wireless device (e.g., depend on the number of SCC and the activation/deactivation status of SCell on one or more of SCCs, measurement cycle, etc.). In some cases, the allowed interruption level may be associated with the type of operation to be performed by the wireless device on one or more cells of at least any SCC with deactivated SCell. Examples of operations include wireless device measurements, activation of SCell, deactivation of SCell, configuration of SCell, de-configuration of SCell etc. In certain embodiments, the allowed interruption may depend on the type of measurement performed by the wireless device on one or more cells of at least any SCC with the deactivated SCell (e.g., RSSI, RSRP, RSRQ, cell identification, UE Rx-Tx time difference, OTDOA RSTD etc.). In certain embodiments, the allowed interruption may depend on the type of measurement configuration used for performing one or more measurements by the wireless device on one or more cells of at least any SCC with the deactivated SCell. The measurement configuration can be the same for all carriers, or can be different for different carriers or common for some of the carriers. Examples of measurement configurations include, but are not limited to: a discovery measurement configuration; an RSSI measurement configuration; an SCell measurement cycle configuration; a PRS configuration; and a SRS configuration.

The allowed interruption level may be RSSI-specific and/or may be comprised in a total amount of interruption due to RSSI-based measurements as well as other UE activities. In one example, there may be no interruption (e.g., 0 time or 0 probability) allowed for RSSI-based measurements or no additional interruption due to the RSSI-based measurements when they are performed.

The wireless device receives, from a network node, a RSSI configuration for an RSSI-based measurement on one of first carrier frequency 505a, 505b and second carrier frequency 510a, 510b. In certain embodiments, such as those for controlling the impact of interruptions on at least one carrier-specific RSSI-based measurement applicable to Scenarios 1 and 2 illustrated in FIG. 5, the received RSSI configuration may be an RSSI configuration for the RSSI-based measurement on first carrier frequency 505a, 505b. Thus, at this step the wireless device receives an RSSI configuration from a network node (e.g., network node 415 described above with respect to FIG. 4) for the RSSI-based measurement on first carrier frequency 505a, 505b. Some example RSSI configuration parameters include, but are not limited to: a RSSI window length, a RSSI window periodicity, a time offset to the beginning of the RSSI window, RSSI bandwidth, channelOccupancyThreshold, and any other suitable RSSI configuration parameter.

In certain embodiments, the wireless device may receive one or more additional measurement configurations for one or more carriers for measurements as described above with respect to obtaining the allowed interruption level for the RSSI-based measurement on first carrier frequency 505a, 505b.

The wireless device controls one or more configuration parameters to control an amount of interruption on the first carrier frequency to meet the obtained allowed interruption level. In certain embodiments, such as those for controlling the impact of interruptions on at least one carrier-specific RSSI-based measurement applicable to Scenarios 1 and 2 illustrated in FIG. 5, controlling one or more configuration parameters to control an amount of interruption to meet the obtained allowed interruption level may comprise controlling one or more of: at least one configuration parameter for a pattern-based measurement on second carrier frequency 510a, 510b; at least one RSSI configuration parameter for an RSSI-based measurement on second carrier frequency 510a, 510b; and at least one RSSI configuration parameter for the RSSI-based measurement on first carrier frequency 505a, 505b. Examples of RSSI configuration parameters are described above, and include, but are not limited to: a RSSI window length, a RSSI window periodicity, a time offset to the beginning of the RSSI window, RSSI bandwidth, channelOccupancyThreshold, and any other suitable RSSI configuration parameter. Examples of pattern-based measurement configuration parameters include, but are not limited to: a pattern periodicity, an occurrence of measurement occasions in time, a measurement occasion periodicity, a measurement occasion length, a time offset for the pattern, etc.

The controlling may comprise one or more of any suitable operations. In certain embodiments, the controlling may comprise RF configuration adaptation (e.g., filter). In certain embodiments, controlling of the amount of interruption may comprise controlling time offset delta 525a between the (carrier-specific) RSSI window 515 on first carrier frequency 505a (i.e., PCC or activated SCC) and measurement occasion 520 on second carrier frequency 510a (i.e., deactivated SCell). In certain embodiments, controlling of the amount of interruption may comprise controlling time offset delta 525b between the (carrier-specific) RSSI window 515 on second carrier frequency 510b and an RSSI window 515 on first carrier frequency 505b. The periodicity of RSSI windows 515 on first carrier frequency 505a, 505b and the periodicity of RSSI windows 515 on second carrier frequency 510b or measurement occasions 520 on second carrier frequency 510a may or may not be the same. The order of occurrence in time of an RSSI window 515 on first carrier frequency 505a, 505b and a measurement occasion 520 or RSSI window 515 on second carrier frequency 510a, 510b, respectively, may or may not be the same as illustrated in the example of FIG. 5.

In certain embodiments, time offset deltas 525a, 525b may be controlled to be within a first threshold (e.g., threshold1) to keep the receiver open and thereby avoid or reduce interruptions by preventing or minimizing the need to reconfigure the receiver which might cause the interruption.

In another example, time offset deltas 525a, 525b may be controlled to be above a second threshold (threshold2) to ensure enough separation so interruptions do not occur during the RSSI measurement time window on first carrier frequency 505a, 505b.

Time offset deltas 525a, 525b may be controlled in any suitable manner. As one example, controlling of time offset delta 525a, 525b may comprise configuring the time offset delta parameter (a relative offset between first carrier frequency 505a, 505b and second carrier frequency 510a, 510b). As another example, controlling of time offset delta 525a, 525b may comprise controlling at least one configuration parameter related to RSSI-based measurement on first carrier frequency 505a, 505b (e.g., a time offset determining the beginning of RSSI window with respect to a reference time, a reference time, RSSI window length, RSSI window periodicity). This includes, for example, increasing an RSSI time window 515 length to shorten time offset deltas 525a, 525b. As still another example, controlling of time offset delta 525b in Scenario 2 may comprise controlling at least one configuration parameter related to RSSI-based measurement on second carrier frequency 510b (e.g., a time offset determining the beginning of RSSI window with respect to a reference time, a reference time, RSSI window length, RSSI window periodicity). As yet another example, controlling of time offset delta 525a in Scenario 1 may comprise controlling at least one configuration parameter related to measurement occasion 520 on second carrier frequency 510a (e.g., a time offset determining the beginning of measurement occasion 520 with respect to a reference time, measurement occasion length, measurement occasion periodicity).

As another example of controlling, the wireless device may perform one or more RSSI-based measurements (e.g., RSSI, channel occupancy, etc.) and meet the corresponding measurement requirements on one or more carriers while meeting the allowed interruption level on at least one serving cell provided that the time offset between at least one parameter in the RSSI configurations belonging to at least two different carriers for RSSI measurements are within a certain threshold. Examples of parameters include measurement duration (also known as measurement occasion), RMTC-period, RMTC-subframeoffset, and any other suitable parameter.

As another example of controlling, the wireless device may perform one or more RSSI-based measurements (e.g., RSSI, channel occupancy, etc.) and meet the corresponding measurement requirements on one or more carriers while meeting the allowed interruption level on at least one serving cell provided that the time offset between at least one parameter in the RSSI configurations belonging to all the carriers for RSSI measurements are within a certain threshold. Examples of parameters include measurement duration (also known as measurement occasion), RMTC-period, RMTC-subframeoffset, and any other suitable parameter.

As another example of controlling, the wireless device may perform one or more RSSI-based measurements (e.g., RSSI, channel occupancy, etc.) and meet the corresponding measurement requirements on one or more carriers while meeting the allowed interruption level on at least one serving cell provided that the time offset between all parameters in the RSSI configurations belonging to all the carriers for RSSI measurements are within a certain threshold. Examples of parameters include measurement duration (also known as measurement occasion), RMTC-period, RMTC-subframe offset, and any other suitable parameter.

As another example of controlling, the wireless device may perform one or more RSSI-based measurements (e.g., RSSI, channel occupancy, etc.) and meet the corresponding measurement requirements on one or more carriers while meeting the allowed interruption level on at least one serving cell provided that the time offset between all parameters in the RSSI configurations belonging to at least two carriers for RSSI measurements are within a certain threshold. Examples of parameters include measurement duration (also known as measurement occasion), RMTC-period, RMTC-subframeoffset, and any other suitable parameter.

As another example of controlling, the wireless device may perform one or more RSSI-based measurements (e.g., RSSI, channel occupancy, etc.) and meet the corresponding measurement requirements on one or more carriers while meeting the allowed interruption level on at least one serving cell provided that the time offset between at least one first parameter in the RSSI configurations belonging to at least one carrier for RSSI measurements and at least one second parameter in at least one non-RSSI configuration belonging to at least one carrier for non-RSSI measurement are within a certain threshold. Examples of first parameters include measurement duration (also known as measurement occasion), RMTC-period, RMTC-subframeoffset, and any other suitable parameter. An example of non-RSSI configuration is discovery measurement configuration. Examples of corresponding second parameters include discovery measurement duration, DMTC-period, DMTC-subframeoffset, and any other suitable parameter. Another example of non-RSSI configuration is PRS configuration. Examples of corresponding second parameters include PRS occasion, PRS periodicity, and any other suitable parameter. Another example of non-RSSI configuration is SCell measurement configuration. Examples of corresponding second parameters include SCell measurement cycle period and any other suitable parameter.

As another example of controlling, the wireless device may perform one or more RSSI-based measurements and meet the corresponding measurement requirements on one or more carriers while meeting the allowed interruption level on at least one serving cell, provided that the RSSI measurement occasions on at least two different carriers occur within a certain threshold.

As another example of controlling, the wireless device may perform one or more measurements and meet the corresponding measurement requirements on one or more carriers while meeting the allowed interruption level on at least one serving cell provided that the discovery measurement occasions and RSSI measurement occasions on the same or different carriers occur within a certain threshold.

As another example of controlling, the wireless device may perform one or more measurements and meet the corresponding measurement requirements on one or more carriers while meeting the allowed interruption level on at least one serving cell provided that the discovery measurement occasions, RSSI measurement occasions and PRS occasions on the same or different carriers occur within a certain threshold.

As another example of controlling, the wireless device may perform one or more measurements and meet the corresponding measurement requirements on one or more carriers while meeting the allowed interruption level on at least one serving cell provided that the discovery measurement occasions, RSSI measurement occasions, PRS occasions, SRS occasion on the same or different carriers occur within a certain threshold.

As another example of controlling, the wireless device may perform one or more measurements and meet the corresponding measurement requirements on one or more carriers while meeting the allowed interruption level on at least one serving cell provided that at least any two of: the discovery measurement occasions, RSSI measurement occasions, PRS occasions, SRS occasions, belonging to the same or different carriers occur within a certain threshold.

As another example of controlling, the wireless device may perform one or more RSSI-based measurements and meet the corresponding measurement requirements on one or more carriers while meeting the allowed interruption level on at least one serving cell provided that the RMTC-periods of the at least two different carriers are within a certain threshold.

As another example of controlling, the wireless device may perform one or more measurements and meet the corresponding measurement requirements on one or more carriers while meeting the allowed interruption level on at least one serving cell provided that the DMTC-period and RMTC-period on the same or different carriers are within a certain threshold.

As another example of controlling, the wireless device may perform one or more measurements and meet the corresponding measurement requirements on one or more carriers while meeting the allowed interruption level on at least one serving cell provided that the DMTC-period, RMTC-period and PRS periodicity on the same or different carriers are within a certain threshold.

As another example of controlling, the wireless device may perform one or more measurements and meet the corresponding measurement requirements on one or more carriers while meeting the allowed interruption level on at least one serving cell provided that the DMTC-period, RMTC-period, PRS periodicity and SCell measurement cycle on the same or different carriers are within a certain threshold.

As another example of controlling, the wireless device may perform one or more measurements and meet the corresponding measurement requirements on one or more carriers while meeting the allowed interruption level on at least one serving cell provided that the DMTC-period, RMTC-period, PRS periodicity, SCell measurement cycle and SRS periodicity on the same or different carriers are within a certain threshold.

As another example of controlling, the wireless device may perform one or more measurements and meet the corresponding measurement requirements on one or more carriers while meeting the allowed interruption level on at least one serving cell provided that at least any two of: the DMTC-period, RMTC-period, PRS periodicity, SCell measurement cycle and SRS periodicity belonging to the same or different carriers are within a certain threshold.

As another example of controlling, the wireless device may perform one or more measurements on all carriers configured for measurements (and meet the corresponding measurement requirements) while meeting the allowed interruption level on at least one serving cell provided that the time offset between values of at least one parameter in all the measurement configurations belonging to all the carriers for measurements is within a certain threshold.

As another example of controlling, the wireless device may perform one or more measurements on all carriers configured for measurements (and meet the corresponding measurement requirements) while meeting the allowed interruption level on at least one serving cell provided that the time offsets between values of all parameters in all the measurement configurations belonging to all the carriers for measurements are within their respective thresholds.

As another example of controlling, the wireless device may be allowed a maximum interruption of G % (e.g., 0.5%) in terms of missed ACK/NACK on serving cells (e.g., PCell, PSCell, activated SCells) provided that the RSSI measurement occasions belonging to all carriers of frame structure 3 (FS3) with deactivated SCells are within a certain time window.

As another example of controlling, the wireless device may be allowed a maximum interruption of G % in terms of missed ACK/NACK on serving cells (e.g., PCell, PSCell, activated SCells) provided that the RSSI measurement occasions belonging to all carriers (e.g., CCs of PCell, activated SCell, deactivated SCells) of FS3 are within certain time window.

As another example of controlling, no interruption may be allowed on at least one or on any serving cell below a certain period of measurement occasion (e.g., below rmtc-period of 640 ms). For rmtc-period greater than or equal to 640 ms, maximum allowed interruption is G % (e.g. 0.5%) of missed ACK/NACK provided the RSSI measurement occasions belonging to all carriers of FS3 with deactivated SCells are within a certain time window.

As another example of controlling, no interruption may be allowed on at least one or on any serving cell below a certain period of measurement occasion (e.g., below rmtc-period of 640 ms). For rmtc-period greater than or equal to 640 ms, maximum allowed interruption is G % (e.g. 0.5%) of missed ACK/NACK provided the RSSI measurement occasions belonging to all carriers of FS3 are within a certain time window.

In certain embodiments, one or more of the controlling operations described above may apply. Moreover, the above described controlling actions in the wireless device may require the wireless device to adapt one or more measurement procedures to meet one or more measurement requirements. The wireless device measurement requirements may be interchangeably referred to as one or more of performance requirements, RRM requirements, mobility requirements, and positioning measurement requirements. Examples of wireless device requirements related to wireless device measurements include: measurement time; measurement reporting time or delay; measurement accuracy (e.g., RSRP/RSRQ accuracy); number of cells to be measured over the measurement time; cell selection delay; cell reselection delay; measurement rate for cell selection and/or cell reselection, and any other suitable requirements. Examples of measurement time include, but are not limited to: L1 measurement period, cell identification time or cell search delay, evaluation period for cell selection or cell reselection, CGI acquisition delay, or any other suitable measurement time.

The amount of interruption may be defined in any suitable manner. For example, the amount of interruption may comprise any one or more of: a time during which the interruption may be allowed (e.g., in milliseconds, symbols, subframes, slots, etc.); a specific type of time units which are allowed and/or not allowed to be interrupted (e.g., no or a limited amount of interruptions during RSSI windows configured for the UE); a probability of missed UE receptions and/or transmissions (e.g., missed ACK/NACK); and an absolute or relative number or a portion of missed RSSI samples or RSSI symbols.

In certain embodiments, the wireless device may send, to another node, a result of the RSSI-based measurement on first carrier frequency 505a, 505b and/or use the result of the RSSI-based measurement on first carrier frequency 505a, 505b for one or more operational tasks. Examples of the result of the RSSI-based measurement include, but are not limited to, any one or more of: the RSSI-based measurement itself (described above with respect to FIG. 4); a number of RSSI samples used for the RSSI-based measurement; at least one parameter adapted to obtain the RSSI-based measurement, or any other suitable measurement result. Examples of operational tasks include, but are not limited to, any one or more of: a mobility-related action; RRM or resource optimization related action; positioning, or any other suitable operation. The operational task may be autonomous for the wireless device or may be in coordination with a network node.

In certain embodiments, the wireless device may indicate, to another node, an experienced interruption level at the wireless device. In certain embodiments, the experienced interruption level may be the experienced interruption level at the wireless device during the RSSI-based measurement on first carrier frequency 505a, 505b. The indication may be implicit or explicit. The experienced interruption level may be indicated in any suitable manner. For example, in certain embodiments the experienced interruption level may be indicated in time units (e.g., milliseconds, symbols, slots, subframes, etc.), as a statistical characteristic (e.g., probability of missed ACK/NACKs, confidence, uncertainty, etc.), as a boolean indicator (e.g., experienced interruption or no interruption), or in any other suitable manner.

As described above, according to one example embodiment, a method in a network node is disclosed. Examples of network nodes are described above in relation to FIG. 4 and below in relation to FIGS. 14-15 and 17. The network node determines a CA configuration for a wireless device. The network node obtains, based on the determined CA configuration, an allowed interruption level on a first carrier frequency. The network node controls, for the wireless device, one or more configuration parameters to control an amount of interruption on the first carrier frequency to meet the obtained allowed interruption level. The network node configures, based on the controlled one or more configuration parameters, the wireless device with a RSSI-based measurement on one of the first carrier frequency and a second carrier frequency, and at least one other measurement.

In certain embodiments, such as those applicable to Scenarios 1 and 2 illustrated in FIG. 5, the method described above may be applied to control the impact of interruptions on at least one carrier-specific RSSI-based measurement. In such cases, the obtained allowed interruption level on first carrier frequency 505a, 505b may be an allowed interruption level for an RSSI-based measurement on first carrier frequency 505a, 505b. The controlled one or more configuration parameters may comprise one or more of: at least one configuration parameter for a pattern-based measurement on second carrier frequency 510a, 510b; at least one RSSI configuration parameter for an RSSI-based measurement on second carrier frequency 510a, 510b; and at least one RSSI configuration parameter for the RSSI-based measurement on first carrier frequency 505a, 505b. The configured RSSI-based measurement may be the RSSI-based measurement on first carrier frequency 505a, 505b. The configured at least one other measurement may be one of: the pattern-based measurement on second carrier frequency 510a, 510b; and the RSSI-based measurement on second carrier frequency 510a, 510b.

As described above, in certain embodiments the network node determines a CA configuration for a wireless device. The network node may determine the wireless device's CA configuration in any suitable manner. In certain embodiments, the CA configuration may be determined based on, for example, one or more of: a configuration parameter received from a wireless device; may be stored in the network node; may be pre-defined or obtained based on a pre-defined rule. The CA configuration may be the current wireless device CA configuration or the CA configuration the wireless device is about to apply.

The CA configuration of the wireless device may have any suitable characteristics. For example, the CA configuration of the wireless device may include one or more of the following characteristics: a set of component carriers (e.g., PCC and one or more of SCCs in UL and DL) with associated carrier frequencies (e.g., absolute frequency channel number such as the EUTRA Absolute Radio-Frequency Channel Number (EARFCN) of the CC); a set of serving cells; a system bandwidth for one or more of the CCs or corresponding serving cells (PCell and SCells); a measurement bandwidth for one or more of the CCs or corresponding serving cells (PCell and SCells); an activation status of the CC (e.g., whether this is an SCC with deactivated SCell) or one or more serving cells; a deactivation status of the CC or one or more serving cells; a type of CA. Examples of CA type include inter-band CA, intra-band contiguous CA, intra-band non-contiguous CA, any combination thereof, and any other suitable carrier aggregation type.

The network node obtains, based on the determined CA configuration, an allowed interruption level on first carrier frequency 505a, 505b. In certain embodiments, such as those applicable to Scenarios 1 and 2 illustrated in FIG. 5, the method described above may be applied to control the impact of interruptions on at least one carrier-specific RSSI-based measurement. In such cases, the obtained allowed interruption level on first carrier frequency 505a, 505b may be an allowed interruption level for an RSSI-based measurement on first carrier frequency 505a, 505b.

The network node controls, for the wireless device, one or more configuration parameters to control an amount of interruption on the first carrier frequency to meet the obtained allowed interruption level. In certain embodiments, such as those applicable to Scenarios 1 and 2 illustrated in FIG. 5, the method described above may be applied to control the impact of interruptions on at least one carrier-specific RSSI-based measurement. In such cases, the controlled one or more configuration parameters may comprise one or more of: at least one configuration parameter for a pattern-based measurement on second carrier frequency 510a, 510b; at least one RSSI configuration parameter for an RSSI-based measurement on second carrier frequency 510a, 510b; and at least one RSSI configuration parameter for the RSSI-based measurement on first carrier frequency 505a, 505b.

The network node configures, based on the controlled one or more configuration parameters, the wireless device with a RSSI-based measurement on one of first carrier frequency 505a, 505b and second carrier frequency 510a, 510b, and at least one other measurement. In certain embodiments, such as those applicable to Scenarios 1 and 2 illustrated in FIG. 5, the method described above may be applied to control the impact of interruptions on at least one carrier-specific RSSI-based measurement. In such cases, the configured RSSI-based measurement may be an RSSI-based measurement on first carrier frequency 505a, 505b. The configured at least one other measurement may be one of: the pattern-based measurement on second carrier frequency 510a, 510b; and the RSSI-based measurement on second carrier frequency 510a, 510b.

In certain embodiments, the network node may send, to the wireless device, a parameter related to the obtained allowed interruption level to further control the interruption level at the UE due to the at least one RSSI-based measurement.

The methods for controlling of the amount of interruption may apply in specific conditions or may further depend on conditions. As one example, controlling of the amount of interruption may apply if RSSI window 515 periodicity on second carrier frequency 510b is above threshold_X and/or below threshold_Y. As another example, controlling of the amount of interruption may apply if the periodicity of measurement occasion 520 of second carrier frequency 510a is above threshold_X and/or below threshold_Y. As still another example, controlling of the amount of interruption may apply if RSSI window 515 periodicity on first carrier frequency 505a, 505b is above threshold_X and/or below threshold_Y. As yet another example, controlling of the amount of interruption may apply if a length of RSSI window 515 is above threshold_X and/or below threshold_Y. As another example, controlling of the amount of interruption may apply if second carrier frequency 510a, 510b is an LAA carrier. As another example, controlling of the amount of interruption may apply if first carrier frequency 505a, 505b is an LAA carrier. As still another example, controlling of the amount of interruption may apply if the RSSI-based measurement is of a specific type (i.e., the methods for controlling may not apply or may differ for another RSSI-based measurement type). As yet another example, controlling of the amount of interruption may apply if the channelOccupancyThreshold is above threshold_X and/or below threshold_Y. In certain embodiments, any suitable combination of the above conditions may apply. In some cases, none of the above conditions may apply.

Although FIG. 5 illustrates one PCC or activated SCC and one deactivated SCell in each of Scenarios 1 and 2, the present disclosure is not limited to such an example. Rather, the present disclosure contemplates that any suitable configuration of CCs may be used. For example, the number of deactivated CCs may be one or larger. The number of activated SCC may be zero or larger. In case of multiple activated CCs (i.e., one PCC and at least one SCC), the amount of interruption may be controlled per carrier and/or in total. In case of multiple deactivated CC, the methods of controlling may apply per each carrier separately or jointly over multiple carriers.

In certain embodiments, methods in a wireless device and methods in a network node are disclosed for controlling the impact of interruptions due to RSSI-based measurements. Examples of these embodiments are described below with respect to FIG. 6.

Figure 6:
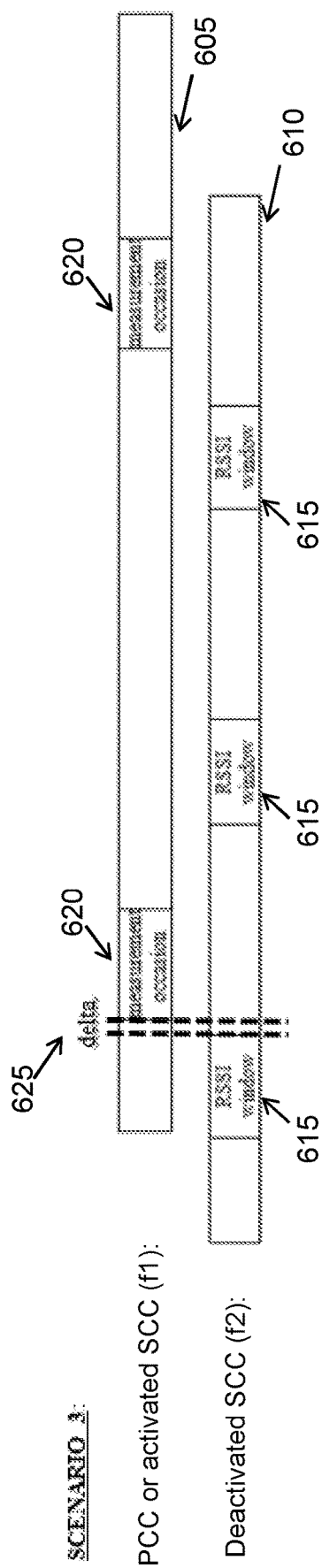
FIG. 6 illustrates a third example scenario in which methods for controlling the impact of interruptions due to RSSI-based measurements may be applied, in accordance with certain embodiments.

FIG. 6 illustrates a third example scenario in which methods for controlling the impact of interruptions due to RSSI-based measurements may be applied, in accordance with certain embodiments. More particularly, FIG. 6 illustrates a third scenario, Scenario 3. In Scenario 3, a PCC or activated SCC on first carrier frequency 605 is illustrated together with a deactivated SCC on second carrier frequency 610. PCC or activated SCC on first carrier frequency 605 is shown with a plurality of measurement occasions 620. Examples of measurement occasions 620 include, but are not limited to: a pattern-based measurement (e.g., RSTD for positioning, discovery signal measurements, etc.). Deactivated SCell on second carrier frequency 610 is shown with a plurality of RSSI windows 615. A time offset delta 625 is shown as the period between the end of a first RSSI window 615 on deactivated SCC on second carrier frequency 610 and the beginning of a first measurement occasion 620 on PCC or activated SCC on first carrier frequency 605.

The methods in a wireless and the methods in a network node for controlling the impact of interruptions due to RSSI-based measurements described herein may apply, for example, in Scenario 3 shown in FIG. 6. As described above, according to one example embodiment a method in a wireless device is disclosed. Examples of wireless devices are described above in relation to FIG. 4 and below with respect to FIGS. 13 and 16. The wireless device determines a carrier aggregation configuration for the wireless device, and obtains, based on the determined carrier aggregation configuration for the wireless device, an allowed interruption level on a first carrier frequency. The wireless device receives, from a network node, a RSSI configuration for an RSSI-based measurement on one of the first carrier frequency and a second carrier frequency. The wireless device controls one or more configuration parameters to control an amount of interruption on the first carrier frequency to meet the obtained allowed interruption level.

In certain embodiments, such as those applicable to Scenario 3 illustrated in FIG. 6, the received RSSI configuration may be an RSSI configuration for an RSSI-based measurement on second carrier frequency 610. Controlling one or more configuration parameters to control an amount of interruption to meet the obtained allowed interruption level may comprise controlling one or more of: at least one configuration parameter for a pattern-based measurement on first carrier frequency 605; and at least one RSSI configuration parameter for an RSSI-based measurement on second carrier frequency 610.

In certain embodiments, controlling the amount of interruption may comprise controlling time offset delta 625 between the (carrier-specific) RSSI window 615 on second carrier frequency 610 and measurement occasion 620 on first carrier frequency 605. The periodicity of RSSI windows 615 on second carrier frequency 610 and the periodicity of measurement occasions 620 on first carrier frequency 605 may or may not be the same. The order of occurrence in time of RSSI window 615 on second carrier frequency 610 and measurement occasion 620 on first carrier frequency 605 may or may not be the same as illustrated in FIG. 6.

As described above, the wireless device determines a carrier aggregation configuration for the wireless device. The wireless device may determine the CA configuration in any suitable manner. In certain embodiments, the CA configuration may be determined based on, for example, one or more of: a configuration parameter received from a network node (e.g., allowedInterruptions indicator); at least one configuration parameter received from the wireless device; information stored in the wireless device or network node; a pre-defined CA configuration; a CA configuration obtained based on a pre-defined rule; and may be based on history. The CA configuration may be the current CA configuration of the wireless device or the CA configuration the wireless device is about to apply.

The CA configuration for the wireless device may have any suitable characteristics. For example, the CA configuration for the wireless device may include one or more of the following characteristics: a set of component carriers (e.g., PCC and one or more of SCCs in UL and DL) with associated carrier frequencies (e.g., absolute frequency channel number such as EARFCN of the CC); a set of serving cells; a system bandwidth for the CCs or corresponding serving cells (PCell and SCells); a measurement bandwidth for the CCs or corresponding serving cells (PCell and SCells); an activation status of the CC (e.g., whether this is an SCC with deactivated SCell); a deactivation status of the CC; and a CA type. Examples of CA type include inter-band CA, intra-band contiguous CA, intra-band non-contiguous CA or any combination thereof, or any other suitable CA type.

The wireless device obtains, based on the determined carrier aggregation configuration for the wireless device, an allowed interruption level on first carrier frequency 605. The wireless device may obtain the allowed interruption level in any suitable manner. In certain embodiments, the obtaining may be based on, for example, one or more of: at least one parameter related to the level of interruption sent earlier to the wireless device (e.g., allowedInterruption in RRC); a pre-defined value; may be obtained based on a pre-defined rule; may be obtained based on wireless device measurements; based on history; and any other suitable manner. Examples of interruption levels include, but are not limited to: the maximum allowed number of impacted subframes, RSSI samples or RSSI symbols, the maximum allowed interruption time, a X % probability of missed ACK/NACK, or any other suitable interruption level.

In some cases, the allowed interruption level may be associated with the CA configuration (e.g., depend on the number of SCC and the activation/deactivation status of SCell on one or more of SCCs, measurement cycle, type of CA, etc.). In some cases, the allowed interruption level may also be associated with the type of operation to be performed by the UE on one or more cells of at least any SCC with deactivated SCell. Examples of operations include, but are not limited to: wireless device measurements; activation of SCell; deactivation of SCell; configuration of SCell; de-configuration of SCell; and any other suitable operation. In some cases, the allowed interruption may depend on the type of wireless device measurement performed on one or more cells of at least any SCC with the deactivated SCell (e.g., RSSI, RSRP, RSRQ, cell identification, UE Rx-Tx time difference, OTDOA RSTD etc.).

In certain embodiments, the allowed interruption may depend on the type of measurement configuration used for performing one or more wireless device measurements on one or more cells of at least any SCC with the deactivated SCell. The measurement configuration can be the same for all carriers or can be different for different carriers or common for some of the carriers. Examples of measurement configurations include, but are not limited to: discovery measurement configuration; RSSI measurement configuration; SCell measurement cycle configuration; PRS configuration; and SRS configuration.

The allowed interruption level may be RSSI-specific and/or may be comprised in the total amount of interruption due to RSSI-based measurements but also other wireless device activities. In one specific example, there may be no interruption (e.g., 0 time or 0 probability) allowed for RSSI-based measurements or no additional interruption due to the RSSI based measurements when they are performed.

The wireless device receives, from a network node, a RSSI configuration for an RSSI-based measurement on one of first carrier frequency 605 and second carrier frequency 610. In certain embodiments, such as those applicable to Scenario 3 illustrated in FIG. 6, the received RSSI configuration may be an RSSI configuration for an RSSI-based measurement on second carrier frequency 610. Example RSSI configuration parameters include, but are not limited to: RSSI window length, RSSI window periodicity, time offset to the beginning of the RSSI window, RSSI bandwidth, channelOccupancyThreshold, and any other suitable parameters. In certain embodiments, the UE may receive one or more additional measurement configurations for one or more carriers for measurements as described above (e.g., discovery measurement configuration, RSSI measurement configuration, SCell measurement cycle configuration, PRS configuration, SRS configuration).

The wireless device controls one or more configuration parameters to control an amount of interruption on first carrier frequency 605 to meet the obtained allowed interruption level. In certain embodiments, such as those for controlling the impact of interruptions due to RSSI-based measurements applicable to Scenario 3 illustrated in FIG. 6, the controlling one or more configuration parameters to control the amount of interruption to meet the obtained allowed interruption level comprises controlling one or more of: at least one configuration parameter for a pattern-based measurement on first carrier frequency 605; and at least one RSSI configuration parameter for an RSSI-based measurement on second carrier frequency 610. Example RSSI configuration parameters have been described above. Examples of pattern-based measurement configuration parameters include, but are not limited to: a pattern periodicity; an occurrence of measurement occasions in time; a measurement occasion periodicity; a measurement occasion length; a time offset for the pattern; and any other suitable parameters.

The amount of interruption may be defined in any suitable manner. In certain embodiments, for example, the amount of interruption may comprise any one or more of: a time during which the interruption may be allowed (e.g., in milliseconds, symbols, subframes, slots, etc.); a specific type of time units which are allowed and/or not allowed to be interrupted (e.g., no or a limited amount of interruptions during pattern-based measurements such as positioning or discovery signal based measurements); and a probability of missed UE receptions and/or transmissions (e.g., missed ACK/NACK).

Examples of controlling are described above in relation to FIG. 5. The various examples described above with respect to controlling the impact of interruptions to RSSI-based measurements are also applicable to Scenario 3 in FIG. 6. In certain embodiments, the controlling may comprise RF configuration adaptation (e.g, filter).

In certain embodiments, time offset delta 625 may be controlled to be within a first threshold (e.g., threshold1) to keep the receiver open and thereby avoid or reduce interruptions by preventing or minimizing the need to reconfigure the receiver which might cause the interruption. In another example, time offset delta 625 may be controlled to be above a second threshold (e.g., threshold2) to ensure enough separation so interruptions do not occur during fall into the RSSI measurement time window on first carrier frequency 605.

Time offset delta 625 may be controlled in any suitable manner. As one example, time offset delta 625 may be controlled by configuring the time offset delta parameter (a relative offset between first carrier frequency 605 and second carrier frequency 610. As another example, time offset delta 625 may be controlled by controlling at least one configuration parameter related to RSSI-based measurement on second carrier frequency 610 (e.g., a time offset determining the beginning of RSSI window with respect to a reference time, a reference time, RSSI window length, RSSI window periodicity). In such a case, RSSI time window length may be increased to shorten the time offset delta. As still another example, time offset delta 625 may be controlled by controlling at least one configuration parameter related to measurement occasion on first carrier frequency 605 (e.g., a time offset determining the beginning of the measurement occasion with respect to a reference time, a reference time, measurement occasion length, measurement occasion periodicity).

The methods for controlling of the amount of interruption may apply in specific conditions or may further depend on conditions. As one example, controlling of the amount of interruption may apply if RSSI window 615 periodicity on second carrier frequency 610 is above threshold_X and/or below threshold_Y. As another example, controlling of the amount of interruption may apply if the periodicity of measurement occasion of second carrier frequency 610 is above threshold_X and/or below threshold_Y. As still another example, controlling of the amount of interruption may apply if RSSI window periodicity on first carrier frequency 605 is above threshold_X and/or below threshold_Y. As yet another example, controlling of the amount of interruption may apply if a length of RSSI window 615 is above threshold_X and/or below threshold_Y. As another example, controlling of the amount of interruption may apply if second carrier frequency 610 is an LAA carrier. As another example, controlling of the amount of interruption may apply if first carrier frequency 605 is an LAA carrier. As still another example, controlling of the amount of interruption may apply if the RSSI-based measurement is of a specific type (i.e., the methods for controlling may not apply or may differ for another RSSI-based measurement type). As yet another example, controlling of the amount of interruption may apply if the channelOccupancyThreshold is above threshold_X and/or below threshold_Y. In certain embodiments, any suitable combination of the above conditions may apply. In some cases, none of the above conditions may apply.

In certain embodiments, the wireless device may indicate, to another node, an experienced interruption level at the wireless device. In certain embodiments, such as those for controlling the impact of interruptions due to RSSI-based measurements applicable to Scenario 3 illustrated in FIG. 6, the wireless device may indicate to another node the experienced interruption level on first carrier frequency 605 at the wireless device due to RSSI-based measurement on second carrier frequency 610. The indication may be implicit or explicit. The experienced interruption level may be indicated in any suitable manner. For example, in certain embodiments the experienced interruption level may be indicated in time units (e.g., milliseconds, symbols, slots, subframes, etc.), as a statistical characteristic (e.g., probability of missed ACK/NACKs, confidence, uncertainty, etc.), as a boolean indicator (e.g., experienced interruption or no interruption), or in any other suitable manner.

As described above, according to one example embodiment, a method in a network node is disclosed. Examples of network nodes are described above in relation to FIG. 4 and below with respect to FIGS. 14-15 and 17. The network node determines a CA configuration for a wireless device. The network node obtains, based on the determined CA configuration, an allowed interruption level on a first carrier frequency. The network node controls, for the wireless device, one or more configuration parameters to control an amount of interruption on the first carrier frequency to meet the obtained allowed interruption level. The network node configures, based on the controlled one or more configuration parameters, the wireless device with a RSSI-based measurement on one of the first carrier frequency and a second carrier frequency, and at least one other measurement.

In certain embodiments, such as those applicable to Scenario 3 illustrated in FIG. 6, the method described above may be applied to control the impact of interruptions caused by RSSI-based measurements. In such cases, the controlled one or more configuration parameters may comprise one or more of: at least one configuration parameter for a pattern-based measurement on first carrier frequency 605; and at least one RSSI configuration parameter for an RSSI-based measurement on second carrier frequency 610. The configured RSSI-based measurement may be an RSSI-based measurement on second carrier frequency 610. The configured at least one other measurement may be the pattern-based measurement on first carrier frequency 605.

As described above, in certain embodiments the network node determines a CA configuration for a wireless device. The network node may determine the wireless device's CA configuration in any suitable manner. In certain embodiments, the CA configuration may be determined based on, for example, one or more of: a configuration parameter received from a wireless device; may be stored in the network node; may be pre-defined or obtained based on a pre-defined rule. The CA configuration may be the current wireless device CA configuration or the CA configuration the wireless device is about to apply.

The CA configuration of the wireless device may have any suitable characteristics. For example, the CA configuration of the wireless device may include one or more of the following characteristics: a set of component carriers (e.g., PCC and one or more of SCCs in UL and DL) with associated carrier frequencies (e.g., absolute frequency channel number such as the EUTRA Absolute Radio-Frequency Channel Number (EARFCN) of the CC); a set of serving cells; a system bandwidth for one or more of the CCs or corresponding serving cells (PCell and SCells); a measurement bandwidth for one or more of the CCs or corresponding serving cells (PCell and SCells); an activation status of the CC (e.g., whether this is an SCC with deactivated SCell) or one or more serving cells; a deactivation status of the CC or one or more serving cells; a type of CA. Examples of CA type include inter-band CA, intra-band contiguous CA, intra-band non-contiguous CA, any combination thereof, and any other suitable carrier aggregation type.

The network node obtains, based on the determined CA configuration, an allowed interruption level on first carrier frequency 605. The network node controls, for the wireless device, one or more configuration parameters to control an amount of interruption on the first carrier frequency to meet the obtained allowed interruption level. In certain embodiments, such as those applicable to Scenario 3 illustrated in FIG. 6, the method described above may be applied to control the impact of interruptions caused by RSSI-based measurements. In such cases, the controlled one or more configuration parameters may comprise one or more of: at least one configuration parameter for a pattern-based measurement on first carrier frequency 605; and at least one RSSI configuration parameter for an RSSI-based measurement on second carrier frequency 610.

The examples of operations for controlling the impact of interruptions to RSSI-based measurements described above with respect to FIG. 5 are equally applicable to the various embodiments described in relation to FIG. 6. The various examples of controlling operations described above may require the network node to adapt or adjust one or more configuration parameters related to at least RSSI configuration. The adaptation is done to ensure that the wireless device is able to meet measurement requirements and does not exceed the allowed level of interruption on at least one serving cell while performing one or more measurements based on at least one type of measurement configuration.

For example, any of the examples of controlling operations described above in relation to FIG. 5 as applied to Scenario 3 illustrated in FIG. 6 may require the network node to adjust or adapt RMTC-period, RMTC-subframeoffset, measurement duration, etc. The rules in the various examples described above may further require the network node to adapt one or more configuration parameters related to one or more non-RSSI configurations (e.g., one or more parameters are PRS configuration, Discovery measurement configuration etc.). A non-limiting example of adaption is configuring for example RMTC-period and DMTC-period on the same or different carriers within a certain threshold (e.g., within 40 ms). Another non-limiting example of adaption is configuring, for example, discovery measurement occasion for discovery measurements and RSSI measurement occasion on the same or different carriers such that the discovery measurement occasion and RSSI measurement occasion occur within a certain threshold (e.g., within 10 ms).

The network node configures, based on the controlled one or more configuration parameters, the wireless device with a RSSI-based measurement on one of first carrier frequency 605 and second carrier frequency 610 and at least one other measurement. In certain embodiments, such as those applicable to Scenario 3 illustrated in FIG. 6, the method described above may be applied to control the impact of interruptions caused by RSSI-based measurements. In such cases, the configured RSSI-based measurement may be an RSSI-based measurement on second carrier frequency 610. The configured at least one other measurement may be the pattern-based measurement on first carrier frequency 505.

In certain embodiments, the network node may send, to the wireless device, a parameter related to the obtained allowed interruption level to further control the interruption level at the UE due to the at least one RSSI-based measurement. In certain embodiments, such as those applicable to Scenario 3 illustrated in FIG. 6, the method described above may be applied to control the impact of interruptions caused by RSSI-based measurements. In such a case, the parameter related to the allowed interruption may be a parameter related to the allowed interruption on first carrier frequency 605 due to RSSI-based measurement on second carrier frequency 610.

Although FIG. 6 illustrates one PCC or activated SCC on first carrier frequency 605 and one deactivated SCell on second carrier frequency 610 in Scenario 3, the present disclosure is not limited to such an example. Rather, the present disclosure contemplates that any suitable configuration of CCs may be used. The number of deactivated CCs may be one or larger. The number of activated SCC may be zero or larger. In case of multiple activated CCs (i.e., one PCC and at least one SCC), the amount of interruption may be controlled per carrier and/or in total. In case of multiple deactivated CC, the methods of controlling may apply per each carrier separately or jointly over multiple carriers.

Figure 7:
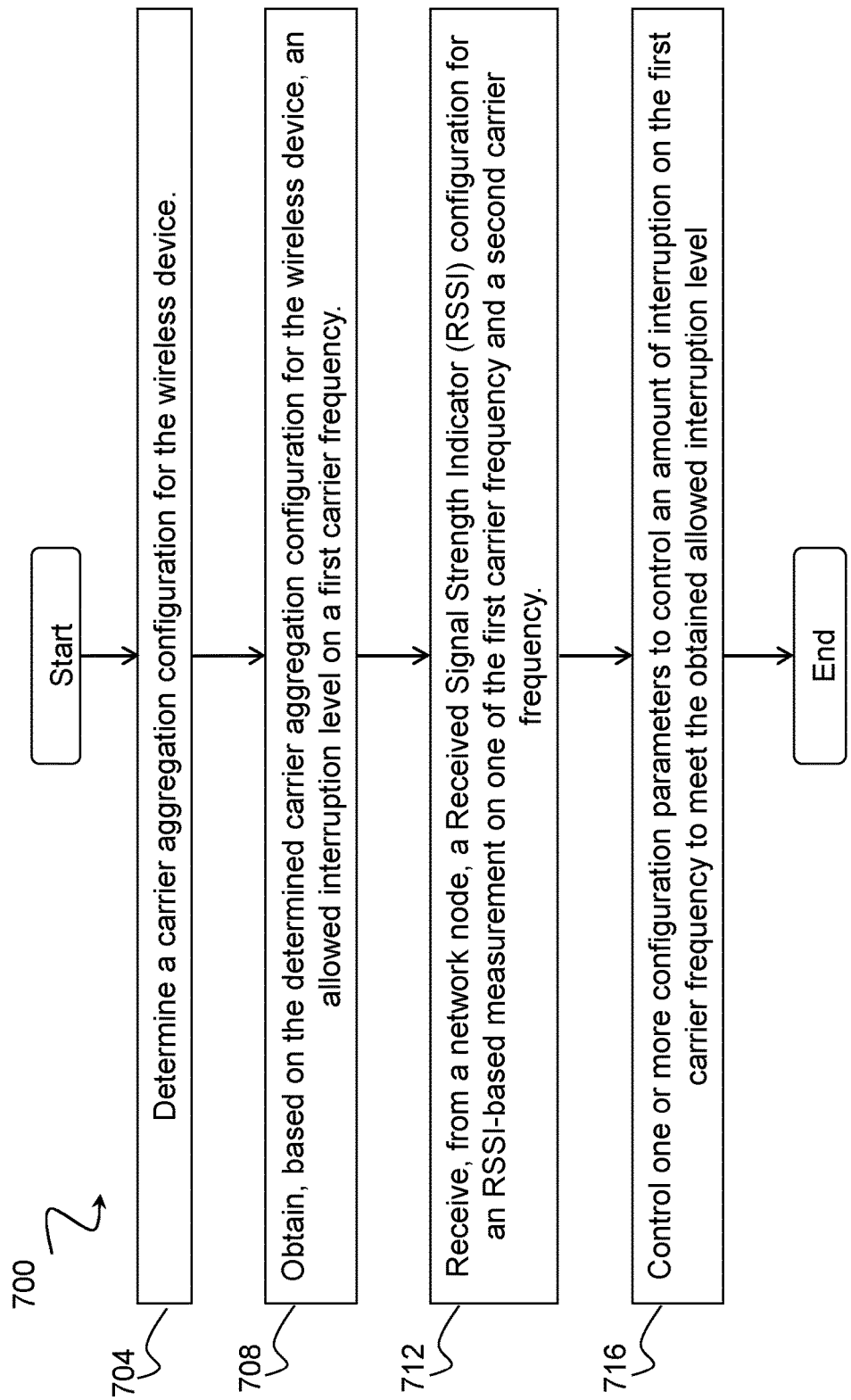
FIG. 7 is a flow chart of a method in a wireless device, in accordance with certain embodiments.

FIG. 7 is a flow chart of a method 700 in a wireless device, in accordance with certain embodiments. The method begins at step 704, where the wireless device determines a carrier aggregation configuration for the wireless device. In certain embodiments, the carrier aggregation configuration may comprise one or more of: a set of component carriers; a set of serving cells; an activation status of one or more serving cells; a deactivation status of one or more serving cells; a measurement cycle configuration; a system bandwidth on a component carrier; a measurement bandwidth on the component carrier; and a type of carrier aggregation.

At step 708, the wireless device obtains, based on the determined carrier aggregation configuration for the wireless device, an allowed interruption level on a first carrier frequency.

At step 712, the wireless device receives, from a network node, a RSSI configuration for an RSSI-based measurement on one of the first carrier frequency and a second carrier frequency. In certain embodiments, the first carrier frequency may comprise one of a primary component carrier and an activated secondary component carrier; and the second carrier frequency may comprise a deactivated secondary component carrier. The RSSI-based measurement may comprise one of an RSSI measurement and a channel occupancy measurement. In certain embodiments, at least the second carrier frequency may be comprised in unlicensed spectrum.

At step 716, the wireless device controls one or more configuration parameters to control an amount of interruption on the first carrier frequency to meet the obtained allowed interruption level. The controlled one or more configuration parameters may comprise one or more of: a time offset delta between an RSSI window on the first carrier frequency and a measurement occasion on the second carrier frequency; a time offset delta between an RSSI window on the second carrier frequency and a measurement occasion on the first carrier frequency; a measurement cycle configuration parameter; an activation status of one or more serving cells; a deactivation status of one or more serving cells; a carrier aggregation configuration parameter; a positioning reference signal (PRS) configuration parameter; a discovery signal measurement configuration parameter; and a sounding reference signal (SRS) configuration parameter. In certain embodiments, the method may comprise indicating, to another node, an experienced interruption level at the wireless device. In certain embodiments, the experienced interruption level at the wireless device may comprise one or more of: an experienced interruption level at the wireless device during the RSSI-based measurement on the first carrier frequency; and an experienced interruption level on the first carrier frequency at the wireless device due to the RSSI-based measurement on the second carrier frequency.

In certain embodiments, the obtained allowed interruption level on the first carrier frequency may be an allowed interruption level for an RSSI-based measurement on the first carrier frequency. The received RSSI configuration may be an RSSI configuration for the RSSI-based measurement on the first carrier frequency. Controlling one or more configuration parameters to control an amount of interruption to meet the obtained allowed interruption level may comprise controlling one or more of: at least one configuration parameter for a pattern-based measurement on the second carrier frequency; at least one RSSI configuration parameter for an RSSI-based measurement on the second carrier frequency; and at least one RSSI configuration parameter for the RSSI-based measurement on the first carrier frequency. The method may comprise sending, to another node, a result of the RSSI-based measurement on the first carrier frequency. The method may comprise using the result of the RSSI-based measurement on the first carrier frequency for one or more operational tasks.

In certain embodiments, the received RSSI configuration may be an RSSI configuration for an RSSI-based measurement on the second carrier frequency. Controlling one or more configuration parameters to control an amount of interruption to meet the obtained allowed interruption level may comprise controlling one or more of: at least one configuration parameter for a pattern-based measurement on the first carrier frequency; and at least one RSSI configuration parameter for an RSSI-based measurement on the second carrier frequency.

Figure 8:
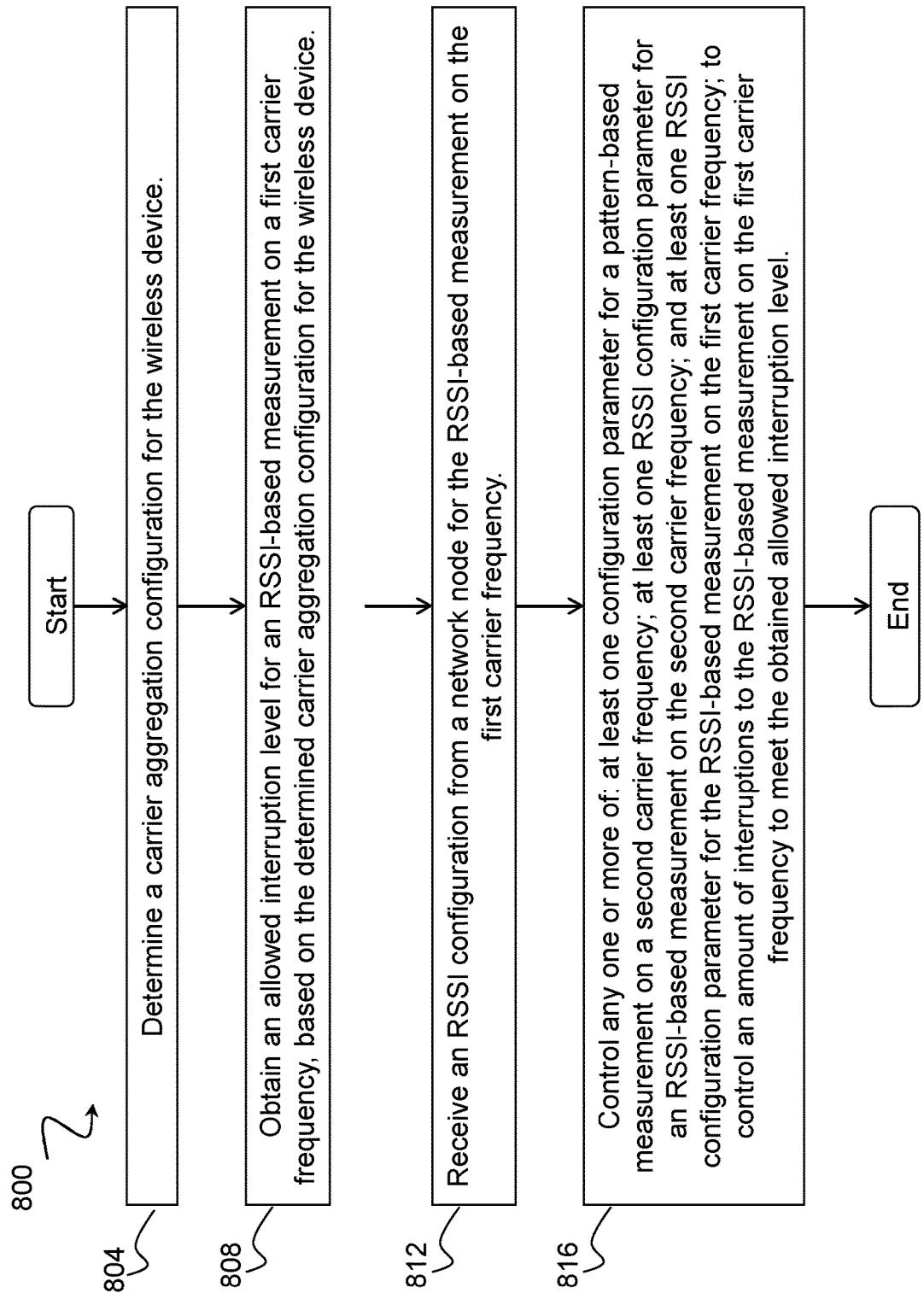
FIG. 8 is a flow chart of a method in a wireless device for controlling the interruption impact on at least one carrier-specific RSSI-based measurement, in accordance with certain embodiments.

FIG. 8 is a flow chart of a method 800 in a wireless device for controlling the interruption impact on at least one carrier-specific RSSI-based measurement, in accordance with certain embodiments. The method begins at step 804, where the wireless device determines a CA configuration for the wireless device. At step 808, the wireless device obtains an allowed interruption level for an RSSI-based measurement on a first carrier frequency, based on the determined CA configuration for the wireless device.

At step 812, the wireless device receives an RSSI configuration from a network node for the RSSI-based measurement on the first carrier frequency. At step 816, the wireless device controls any one or more of: at least one configuration parameter for a pattern-based measurement on a second carrier frequency; at least one RSSI configuration parameter for an RSSI-based measurement on the second carrier frequency; and at least one RSSI configuration parameter for the RSSI-based measurement on the first carrier frequency; to control an amount of interruptions to the RSSI-based measurement on the first carrier frequency to meet the obtained allowed interruption level.

Figure 9:
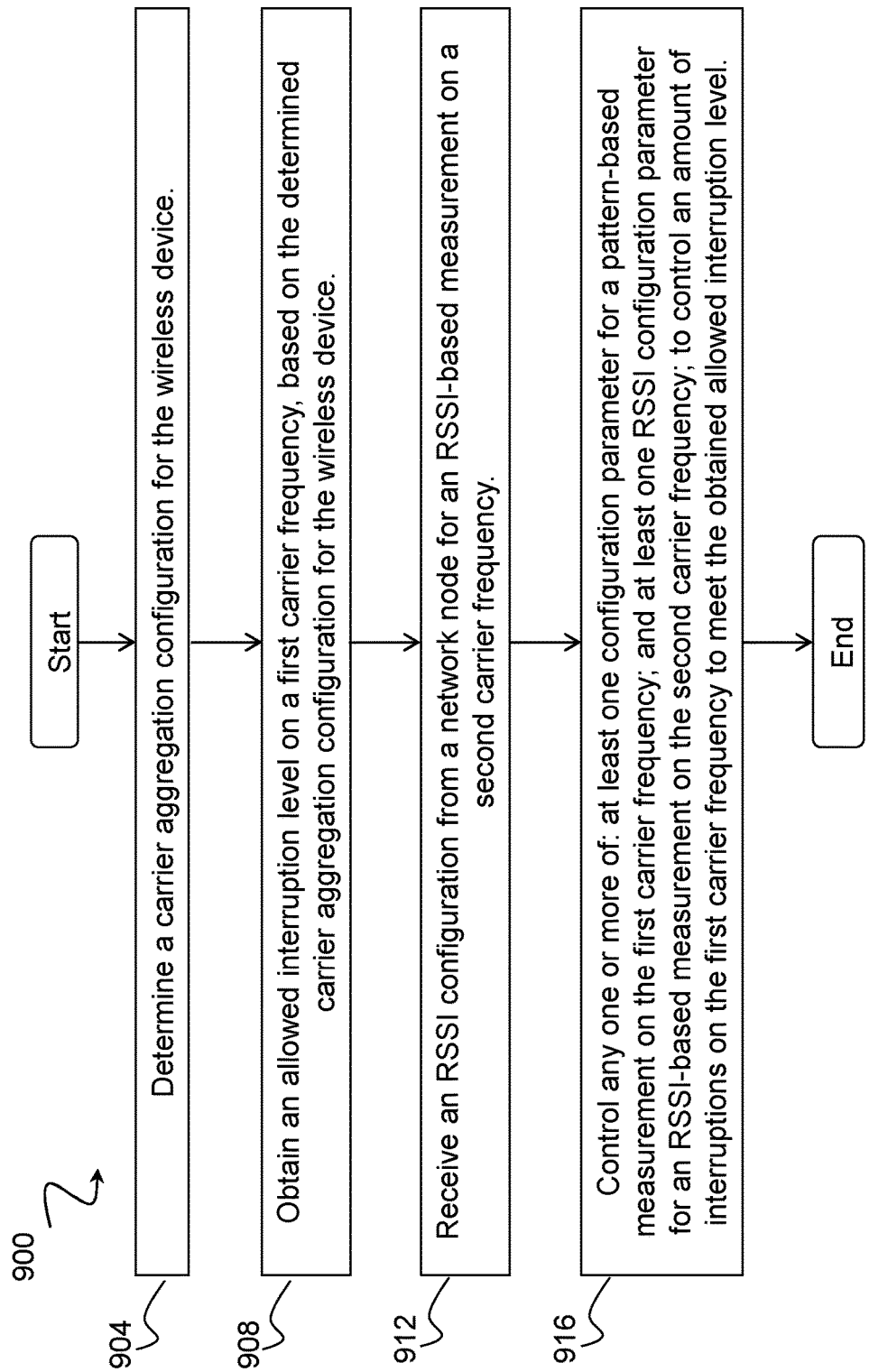
FIG. 9 is a flow chart of a method in a wireless device for controlling the interruption impact of at least one carrier-specific RSSI-based measurement, in accordance with certain embodiments.

FIG. 9 is a flow chart of a method in a wireless device for controlling the interruption impact of at least one carrier-specific RSSI-based measurement, in accordance with certain embodiments. The method begins at step 904, where the wireless device determines a CA configuration for the wireless device. At step 908, the wireless device obtains an allowed interruption level on a first carrier frequency, based on the determined CA configuration for the wireless device.

At step 912, the wireless device receives an RSSI configuration from a network node for an RSSI-based measurement on a second carrier frequency. At step 916, the wireless device controls any one or more of: at least one configuration parameter for a pattern-based measurement on the first carrier frequency; and at least one RSSI configuration parameter for an RSSI-based measurement on the second carrier frequency; to control an amount of interruptions on the first carrier frequency to meet the obtained allowed interruption level.

Figure 10:
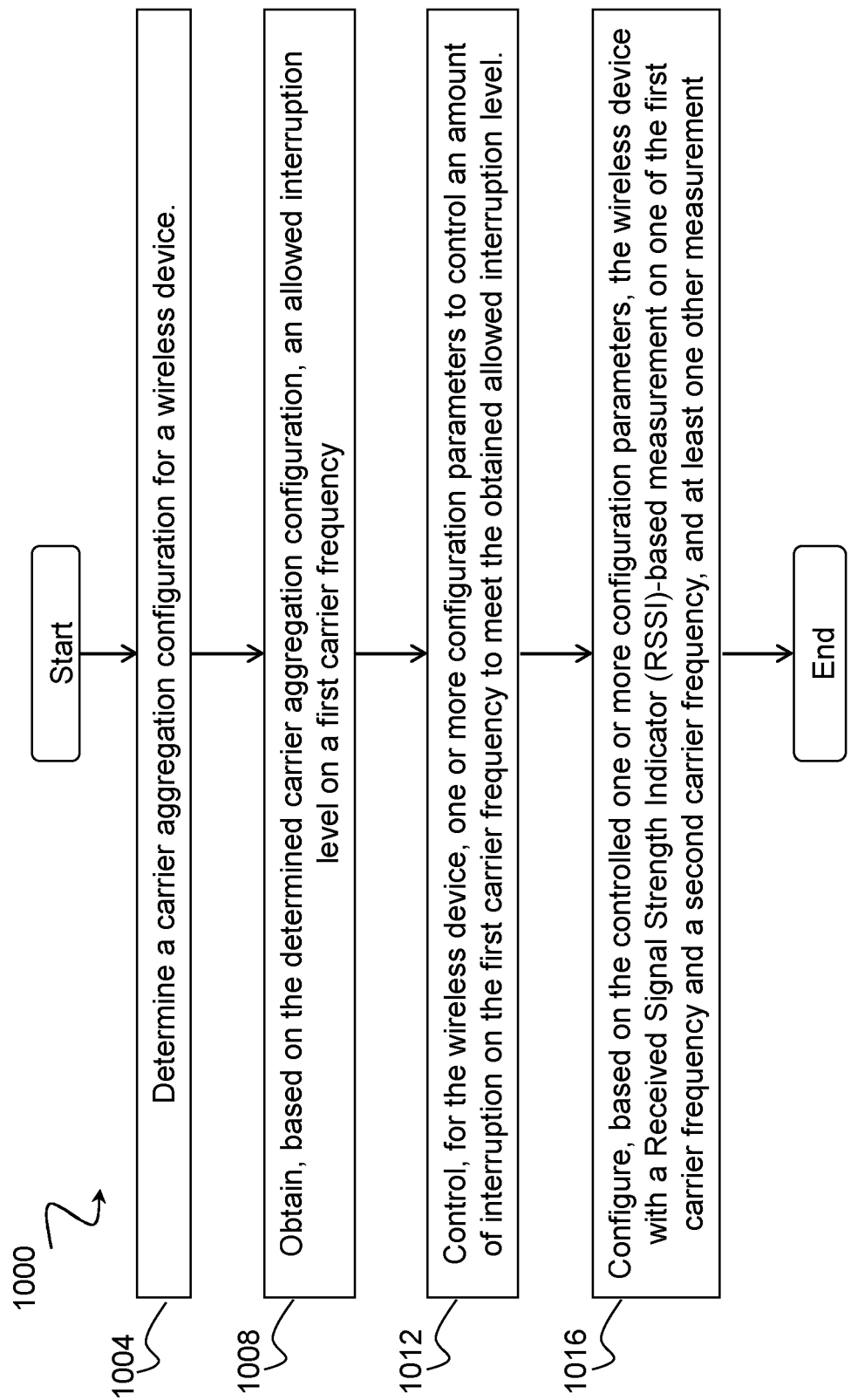
FIG. 10 is a flow chart of a method in a network node, in accordance with certain embodiments.

FIG. 10 is a flow chart of a method 1000 in a network node, in accordance with certain embodiments. The method begins at step 1004, where the network node determines a carrier aggregation configuration for a wireless device. In certain embodiments, the carrier aggregation configuration may comprise one or more of: a set of component carriers; a set of serving cells; an activation status of one or more serving cells; a deactivation status of one or more serving cells; a measurement cycle configuration; a system bandwidth on a component carrier; a measurement bandwidth on the component carrier; and a type of carrier aggregation.

At step 1008, the network node obtains, based on the determined carrier aggregation configuration, an allowed interruption level on a first carrier frequency.

At step 1012, the network node controls, for the wireless device, one or more configuration parameters to control an amount of interruption on the first carrier frequency to meet the obtained allowed interruption level. In certain embodiments, the controlled one or more configuration parameters may comprise one or more of: a time offset delta between an RSSI window on the first carrier frequency and a measurement occasion on the second carrier frequency; a time offset delta between an RSSI window on the second carrier frequency and a measurement occasion on the first carrier frequency; a measurement cycle configuration parameter; an activation status of one or more serving cells; a deactivation status of one or more serving cells; a carrier aggregation configuration parameter; a PRS configuration parameter; a discovery signal measurement configuration parameter; and a SRS configuration parameter.

At step 1016, the network node configures, based on the controlled one or more configuration parameters, the wireless device with a RSSI-based measurement on one of the first carrier frequency and a second carrier frequency, and at least one other measurement. In certain embodiments, the first carrier frequency may comprise one of a primary component carrier and an activated secondary component carrier; and the second carrier frequency comprises a deactivated secondary component carrier. In certain embodiments, at least the second carrier frequency may be comprised in unlicensed spectrum. In certain embodiments, the method may comprise sending, to the wireless device, a parameter related to the obtained allowed interruption level to allow the wireless device to further control the interruption level.

In certain embodiments, the obtained allowed interruption level on the first carrier frequency may be an allowed interruption level for an RSSI-based measurement on the first carrier frequency. The controlled one or more configuration parameters may comprise one or more of: at least one configuration parameter for a pattern-based measurement on the second carrier frequency; at least one RSSI configuration parameter for an RSSI-based measurement on the second carrier frequency; and at least one RSSI configuration parameter for the RSSI-based measurement on the first carrier frequency. The configured RSSI-based measurement may be the RSSI-based measurement on the first carrier frequency. The configured at least one other measurement may be one of: the pattern-based measurement on the second carrier frequency; and the RSSI-based measurement on the second carrier frequency.

In certain embodiments, the controlled one or more configuration parameters may comprise one or more of: at least one configuration parameter for a pattern-based measurement on the first carrier frequency; and at least one RSSI configuration parameter for an RSSI-based measurement on the second carrier frequency. The configured RSSI-based measurement may be an RSSI-based measurement on the second carrier frequency. The configured at least one other measurement may be the pattern-based measurement on the first carrier frequency.

Figure 11:
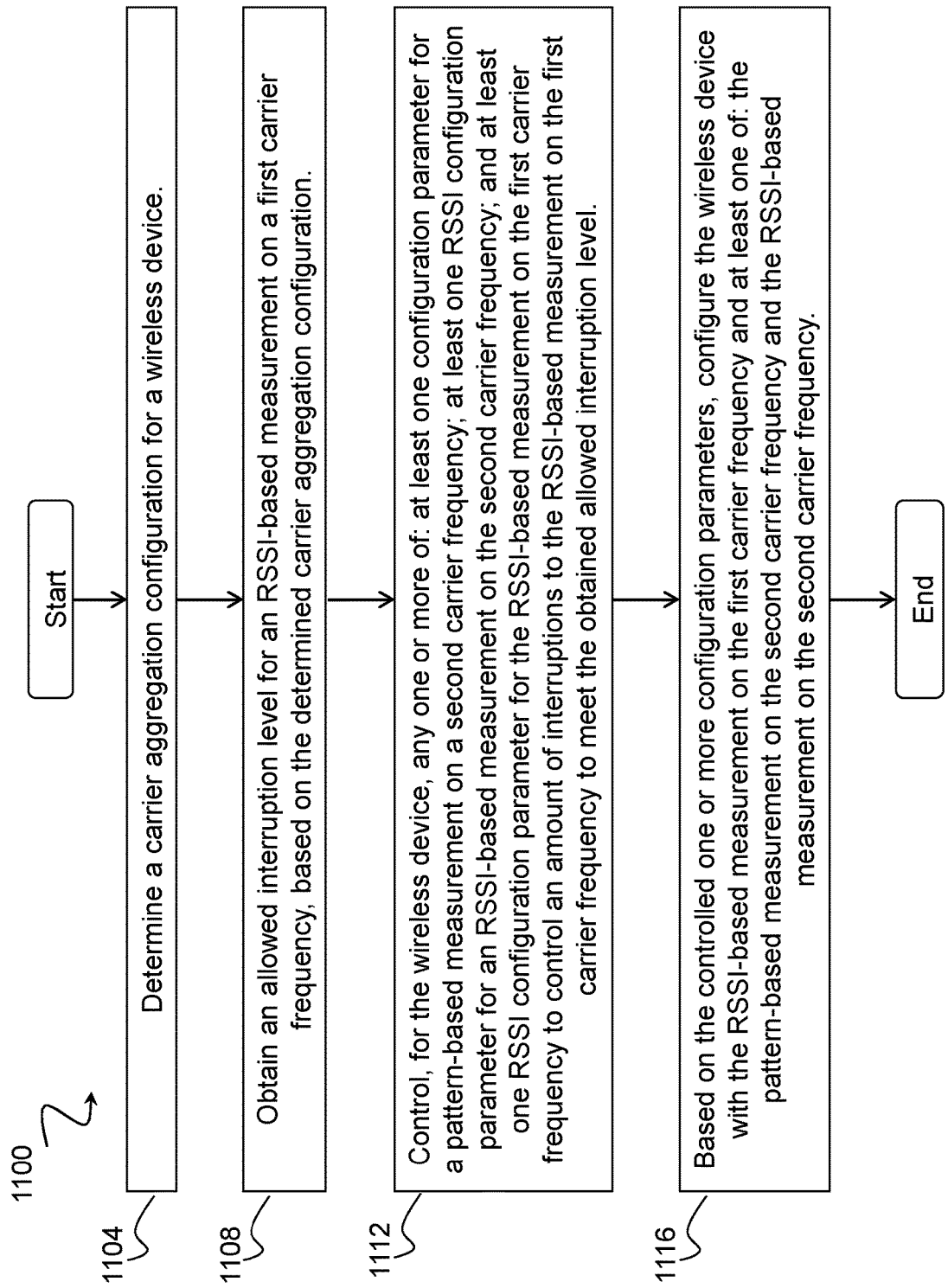
FIG. 11 is a flow chart of a method in a network node for controlling the interruption impact on at least one carrier-specific RSSI-based measurement, in accordance with certain embodiments.

FIG. 11 is a flow chart of a method in a network node for controlling the interruption impact on at least one carrier-specific RSSI-based measurement, in accordance with certain embodiments. The method begins at step 1104 where the network node determines a CA configuration for a wireless device. At step 1108, the network node obtains an allowed interruption level for an RSSI-based measurement on a first carrier frequency, based on the determined carrier aggregation configuration.

At step 1112, the network node controls, for the wireless device, any one or more of: at least one configuration parameter for a pattern-based measurement on a second carrier frequency; at least one RSSI configuration parameter for an RSSI-based measurement on the second carrier frequency; and at least one RSSI configuration parameter for the RSSI-based measurement on the first carrier frequency to control an amount of interruptions to the RSSI-based measurement on the first carrier frequency to meet the obtained allowed interruption level. At step 1116, the network node, based on the controlled one or more configuration parameters, configures the wireless device with the RSSI-based measurement on the first carrier frequency and at least one of: the pattern-based measurement on the second carrier frequency and the RSSI-based measurement on the second carrier frequency.

Figure 12:
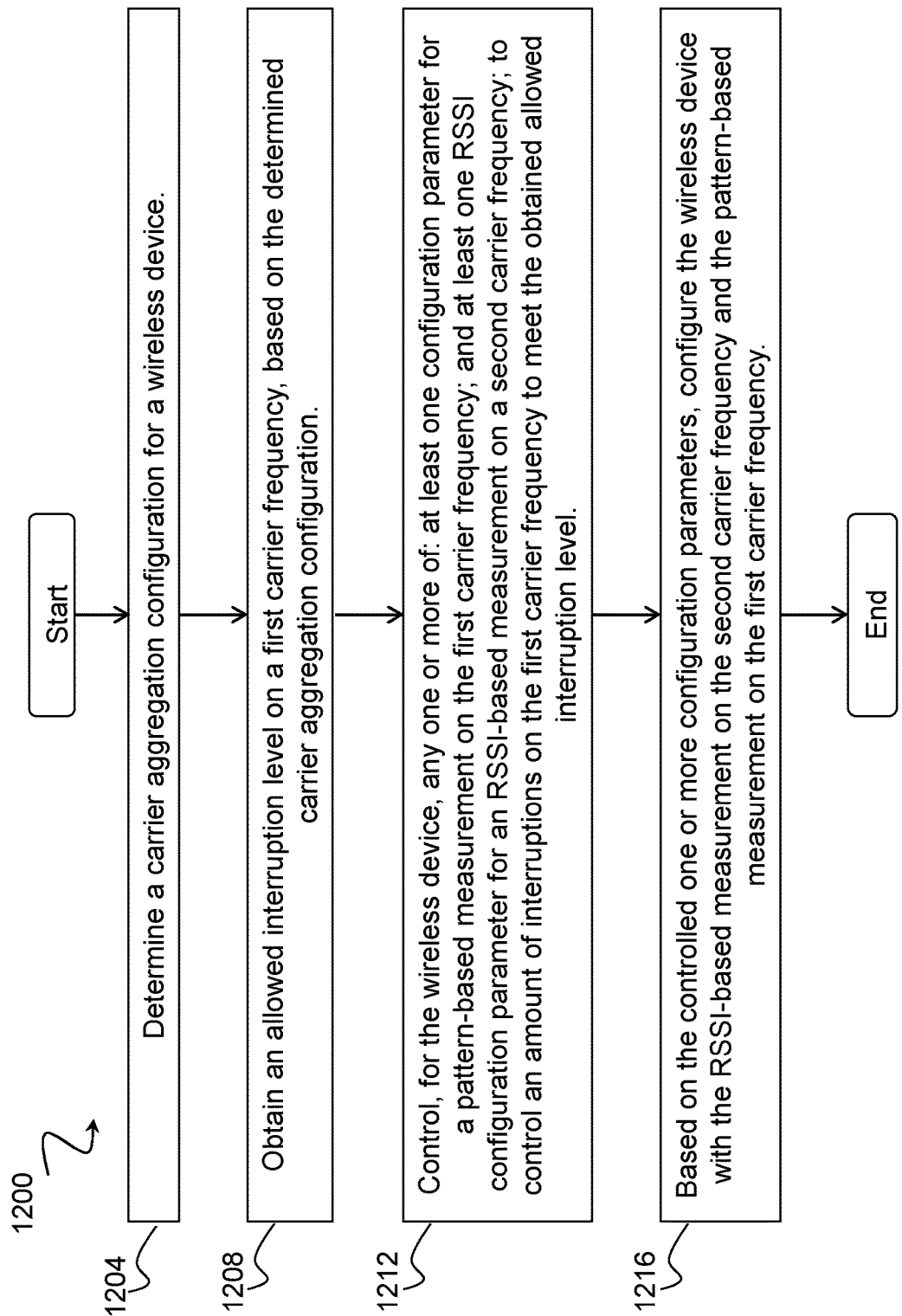
FIG. 12 is a flow chart of a method in a network node for controlling the interruption impact of at least one carrier-specific RSSI-based measurement, in accordance with certain embodiments.

FIG. 12 is a flow chart of a method 1200 in a network node for controlling the interruption impact of at least one carrier-specific RSSI-based measurement, in accordance with certain embodiments. The method begins at step 1204, where the network node determines a CA configuration for a wireless device. At step 1208, the network node obtains an allowed interruption level on a first carrier frequency, based on the determined carrier aggregation configuration.

At step 1212, the network node controls, for the wireless device, any one or more of: at least one configuration parameter for a pattern-based measurement on the first carrier frequency; and at least one RSSI configuration parameter for an RSSI-based measurement on a second carrier frequency; to control an amount of interruptions on the first carrier frequency to meet the obtained allowed interruption level. At step 1216, the network node, based on the controlled one or more configuration parameters, configures the wireless device with the RSSI-based measurement on the second carrier frequency and the pattern-based measurement on the first carrier frequency.

Figure 13:
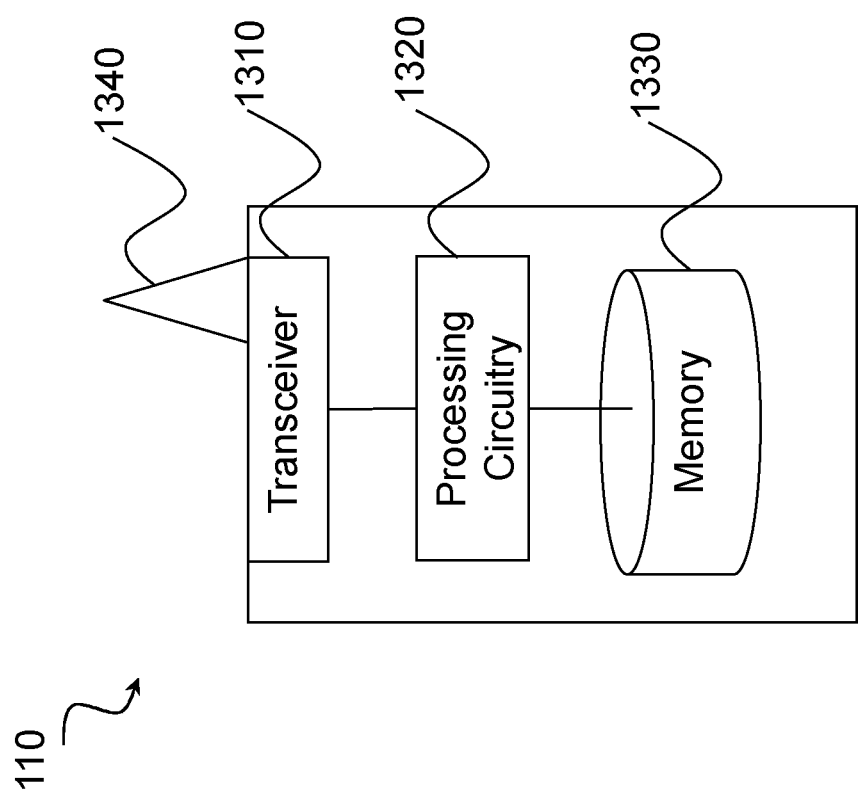
FIG. 13 is a schematic block diagram of an exemplary wireless device, in accordance with certain embodiments.

FIG. 13 is a block schematic of an exemplary wireless device, in accordance with certain embodiments. Wireless device 410 may refer to any type of wireless device communicating with a node and/or with another wireless device in a cellular or mobile communication system. Examples of wireless device 410 include a mobile phone, a smart phone, a PDA (Personal Digital Assistant), a portable computer (e.g., laptop, tablet), a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 410 may also be referred to as UE, a station (STA), a device, or a terminal in some embodiments. Wireless device 410 includes transceiver 1310, processing circuitry 1320, and memory 1330. In some embodiments, transceiver 1310 facilitates transmitting wireless signals to and receiving wireless signals from network node 415 (e.g., via antenna 1340), processing circuitry 1320 executes instructions to provide some or all of the functionality described above as being provided by wireless device 410, and memory 1330 stores the instructions executed by processing circuitry 1320.

Processing circuitry 1320 may include any suitable combination of hardware and software implemented in one or more modules to execute instructions and manipulate data to perform some or all of the described functions of wireless device 410, such as the functions of wireless device 410 described above in relation to FIGS. 1-12. In some embodiments, processing circuitry 1320 may include, for example, one or more computers, one or more central processing units (CPUs), one or more microprocessors, one or more applications, one or more application specific integrated circuits (ASICs), one or more field programmable gate arrays (FPGAs) and/or other logic.

Memory 1330 is generally operable to store instructions, such as a computer program, software, an application including one or more of logic, rules, algorithms, code, tables, etc. and/or other instructions capable of being executed by a processor. Examples of memory 1330 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information, data, and/or instructions that may be used by processing circuitry 1320.

Other embodiments of wireless device 410 may include additional components beyond those shown in FIG. 13 that may be responsible for providing certain aspects of the wireless device's functionality, including any of the functionality described above and/or any additional functionality (including any functionality necessary to support the solution described above). As just one example, wireless device 410 may include input devices and circuits, output devices, and one or more synchronization units or circuits, which may be part of the processing circuitry 1320. Input devices include mechanisms for entry of data into wireless device 410. For example, input devices may include input mechanisms, such as a microphone, input elements, a display, etc. Output devices may include mechanisms for outputting data in audio, video and/or hard copy format. For example, output devices may include a speaker, a display, etc.

Figure 14:
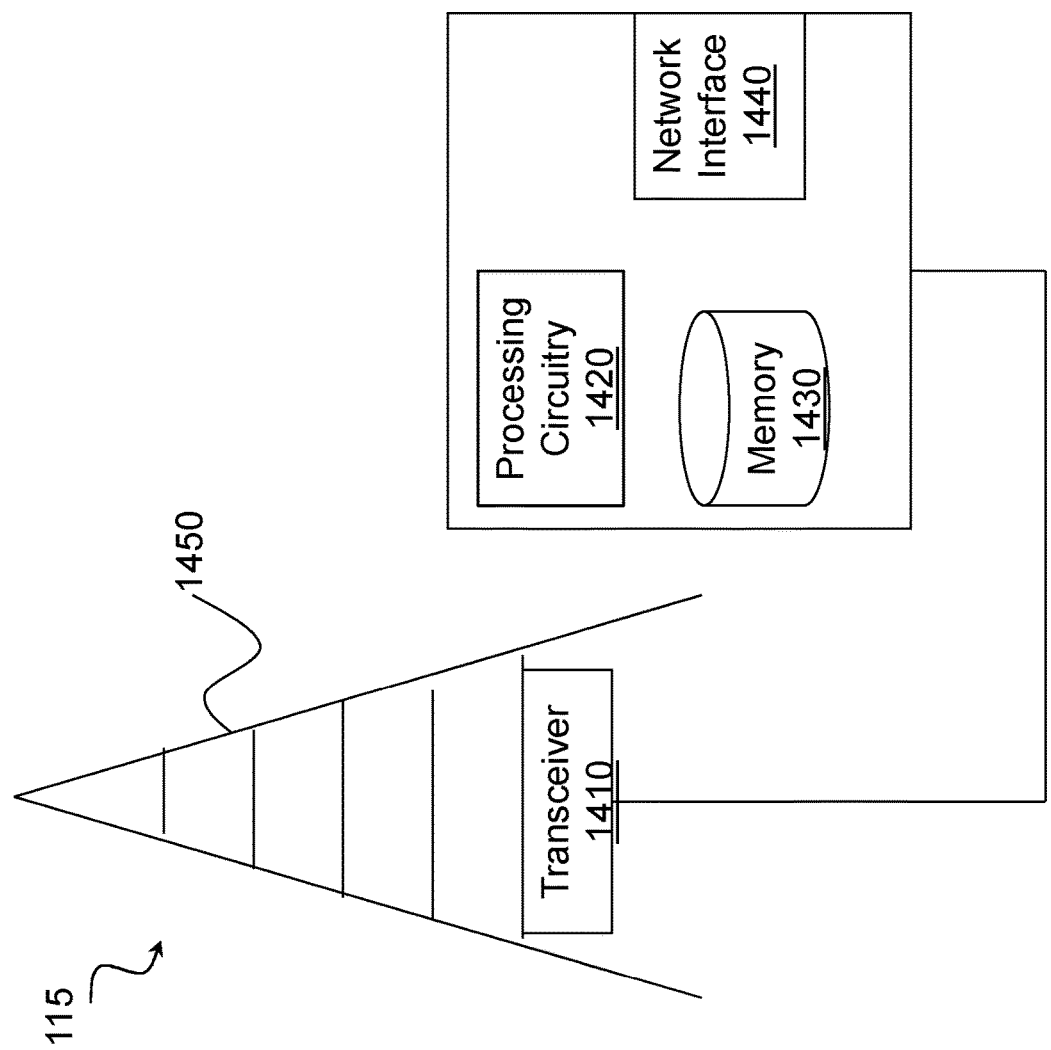
FIG. 14 is a schematic block diagram of an exemplary network node, in accordance with certain embodiments.

FIG. 14 is a block schematic of an exemplary network node, in accordance with certain embodiments. Network node 415 may be any type of radio network node or any network node that communicates with a UE and/or with another network node. Examples of network node 415 include an eNodeB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 415 may be deployed throughout network 100 as a homogenous deployment, heterogeneous deployment, or mixed deployment. A homogeneous deployment may generally describe a deployment made up of the same (or similar) type of network nodes 415 and/or similar coverage and cell sizes and inter-site distances. A heterogeneous deployment may generally describe deployments using a variety of types of network nodes 415 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 415 may include one or more of transceiver 1410, processing circuitry 1420, memory 1430, and network interface 1440. In some embodiments, transceiver 1410 facilitates transmitting wireless signals to and receiving wireless signals from wireless device 410 (e.g., via antenna 1450), processing circuitry 1420 executes instructions to provide some or all of the functionality described above as being provided by a network node 415, memory 1430 stores the instructions executed by processing circuitry 1420, and network interface 1440 communicates signals to backend network components, such as a gateway, switch, router, Internet, Public Switched Telephone Network (PSTN), core network nodes or radio network controllers 130, etc.

Processing circuitry 1420 may include any suitable combination of hardware and software implemented in one or more modules to execute instructions and manipulate data to perform some or all of the described functions of network node 415, such as those described above in relation to FIGS. 1-12 above. In some embodiments, processing circuitry 1420 may include, for example, one or more computers, one or more central processing units (CPUs), one or more microprocessors, one or more applications, and/or other logic.

Memory 1430 is generally operable to store instructions, such as a computer program, software, an application including one or more of logic, rules, algorithms, code, tables, etc. and/or other instructions capable of being executed by a processor. Examples of memory 1430 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1440 is communicatively coupled to processing circuitry 1420 and may refer to any suitable device operable to receive input for network node 415, send output from network node 415, perform suitable processing of the input or output or both, communicate to other devices, or any combination of the preceding. Network interface 1440 may include appropriate hardware (e.g., port, modem, network interface card, etc.) and software, including protocol conversion and data processing capabilities, to communicate through a network.

Other embodiments of network node 415 may include additional components beyond those shown in FIG. 14 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 15:
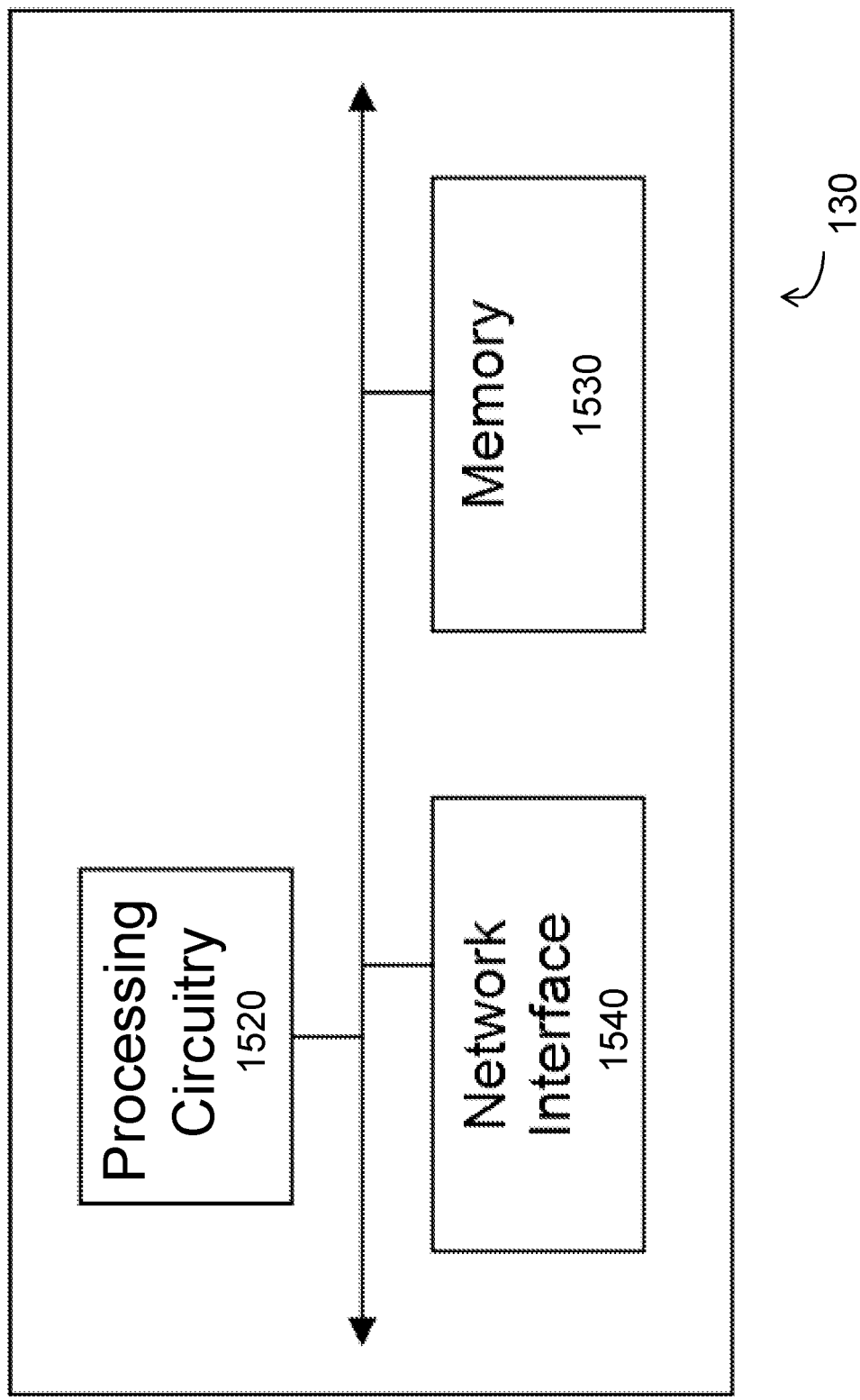
FIG. 15 is a schematic block diagram of an exemplary radio network controller or core network node, in accordance with certain embodiments.

FIG. 15 is a block schematic of an exemplary radio network controller or core network node 130, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 130 includes processing circuitry 1520, memory 1530, and network interface 1540. In some embodiments, processing circuitry 1520 executes instructions to provide some or all of the functionality described above as being provided by the network node, memory 1530 stores the instructions executed by processing circuitry 1520, and network interface 1540 communicates signals to any suitable node, such as a gateway, switch, router, Internet, Public Switched Telephone Network (PSTN), network nodes 415, radio network controllers or core network nodes 130, etc.

Processing circuitry 1520 may include any suitable combination of hardware and software implemented in one or more modules to execute instructions and manipulate data to perform some or all of the described functions of the radio network controller or core network node 130. In some embodiments, processing circuitry 1520 may include, for example, one or more computers, one or more central processing units (CPUs), one or more microprocessors, one or more applications, and/or other logic.

Memory 1530 is generally operable to store instructions, such as a computer program, software, an application including one or more of logic, rules, algorithms, code, tables, etc. and/or other instructions capable of being executed by a processor. Examples of memory 1530 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1540 is communicatively coupled to processing circuitry 1520 and may refer to any suitable device operable to receive input for the network node, send output from the network node, perform suitable processing of the input or output or both, communicate to other devices, or any combination of the preceding. Network interface 1540 may include appropriate hardware (e.g., port, modem, network interface card, etc.) and software, including protocol conversion and data processing capabilities, to communicate through a network.

Other embodiments of the network node may include additional components beyond those shown in FIG. 15 that may be responsible for providing certain aspects of the network node's functionality, including any of the functionality described above and/or any additional functionality (including any functionality necessary to support the solution described above).

Figure 16:
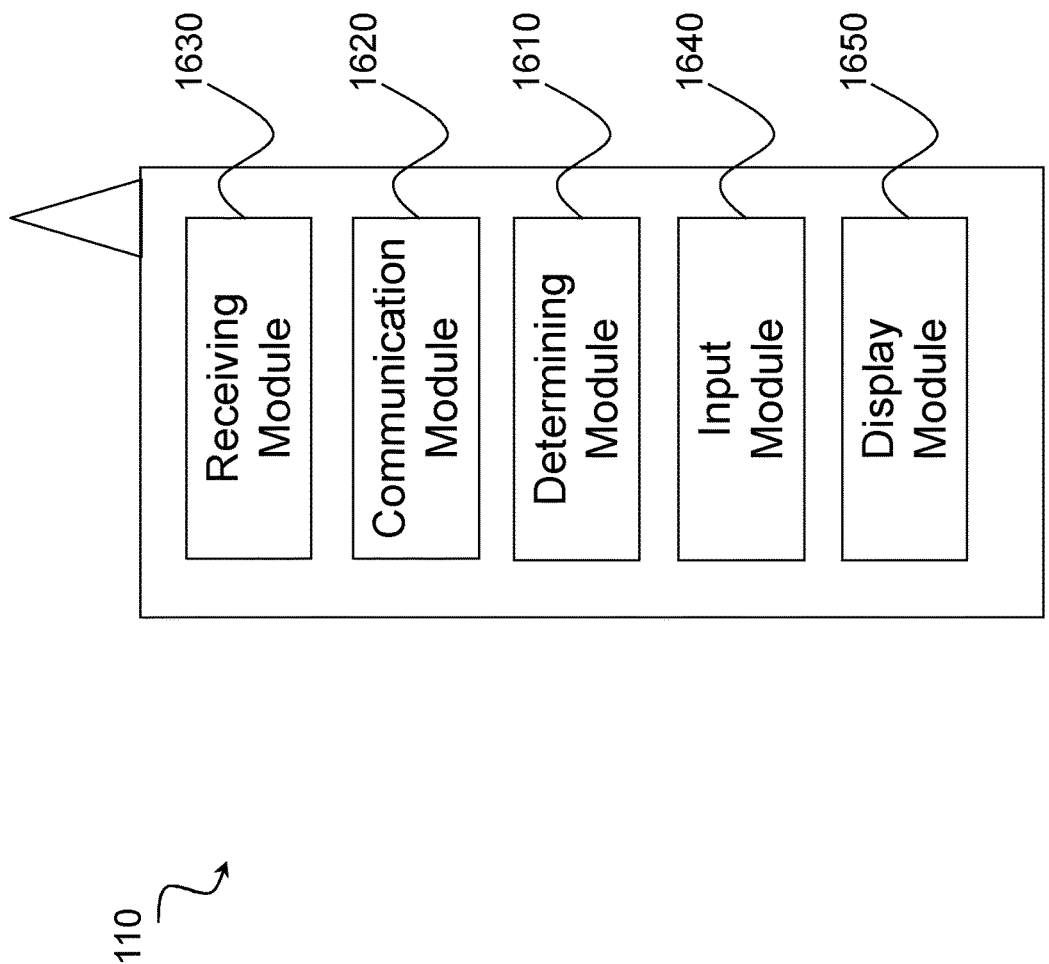
FIG. 16 is a schematic block diagram of an exemplary wireless device, in accordance with certain embodiments.

FIG. 16 is a block schematic of an exemplary wireless device, in accordance with certain embodiments. Wireless device 410 may include one or more modules. For example, wireless device 410 may include a determining module 1610, a communication module 1620, a receiving module 1630, an input module 1640, a display module 1650, and any other suitable modules. In some embodiments, one or more of determining module 1610, communication module 1620, receiving module 1630, input module 1640, display module 1650, or any other suitable module may be implemented using processing circuitry, such as processing circuitry 1320 described above in relation to FIG. 13. In certain embodiments, the functions of two or more of the various modules may be combined into a single module. Wireless device 410 may perform the methods for controlling interruption level with RSSI-based measurements described above with respect to FIGS. 1-12.

Determining module 1610 may perform the processing functions of wireless device 410. For example, determining module 1610 may determine a CA configuration for the wireless device. As another example, determining module 1610 may obtain, based on the determined CA configuration for the wireless device, an allowed interruption level on a first carrier frequency. As still another example, determining module 1610 may control one or more configuration parameters to control an amount of interruption on the first carrier frequency to meet the allowed interruption level. As yet another example, determining module 1610 may use the result of the RSSI-based measurement on the first carrier frequency for one or more operational tasks. Determining module 1610 may include or be included in processing circuitry, such as processing circuitry 1320 described above in relation to FIG. 13. Determining module 1610 may include analog and/or digital circuitry configured to perform any of the functions of determining module 1610 and/or processing circuitry 1320 described above. The functions of determining module 1610 described above may, in certain embodiments, be performed in one or more distinct modules.

Communication module 1620 may perform the transmission functions of wireless device 410. For example, communication module 1620 may send, to another node, a result of the RSSI-based measurement on the first carrier frequency. As another example, communication module 1620 may indicate, to another node, an experienced interruption level at the wireless device. Communication module 1620 may transmit messages to one or more of network nodes 415 of network 100. Communication module 1620 may include a transmitter and/or a transceiver, such as transceiver 1310 described above in relation to FIG. 13. Communication module 1620 may include circuitry configured to wirelessly transmit messages and/or signals. In particular embodiments, communication module 1620 may receive messages and/or signals for transmission from determining module 1610. In certain embodiments, the functions of communication module 1620 described above may be performed in one or more distinct modules.

Receiving module 1630 may perform the receiving functions of wireless device 410. As one example, receiving module 1630 may obtain, based on the determined carrier aggregation configuration for the wireless device, an allowed interruption level on a first carrier frequency. As another example, receiving module 1630 may receive, from a network node, a RSSI configuration for an RSSI-based measurement on one of the first carrier frequency and a second carrier frequency. Receiving module 1630 may include a receiver and/or a transceiver, such as transceiver 1310 described above in relation to FIG. 13. Receiving module 1630 may include circuitry configured to wirelessly receive messages and/or signals. In particular embodiments, receiving module 1630 may communicate received messages and/or signals to determining module 1610. The functions of receiving module 1630 described above may, in certain embodiments, be performed in one or more distinct modules.

Input module 1640 may receive user input intended for wireless device 410. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 1610. The functions of input module 1640 described above may, in certain embodiments, be performed in one or more distinct modules.

Display module 1650 may present signals on a display of wireless device 410. Display module 1650 may include the display and/or any appropriate circuitry and hardware configured to present signals on the display. Display module 1650 may receive signals to present on the display from determining module 1610. The functions of display module 1650 described above may, in certain embodiments, be performed in one or more distinct modules.

Determining module 1610, communication module 1620, receiving module 1630, input module 1640, and display module 1650 may include any suitable configuration of hardware and/or software. Wireless device 410 may include additional modules beyond those shown in FIG. 16 that may be responsible for providing any suitable functionality, including any of the functionality described above and/or any additional functionality (including any functionality necessary to support the various solutions described herein).

Figure 17:
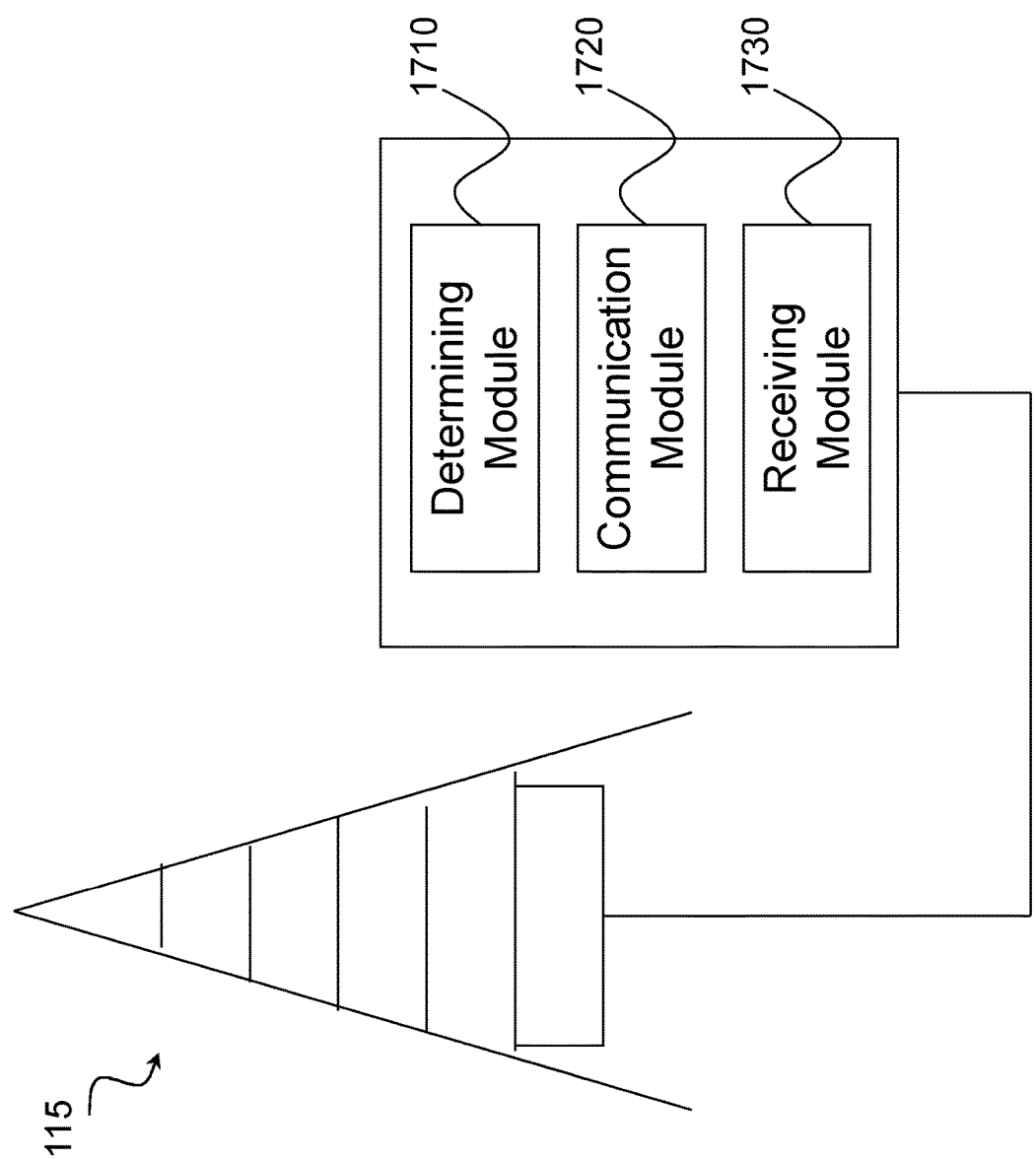
FIG. 17 is a schematic block diagram of an exemplary network node, in accordance with certain embodiments.

FIG. 17 is a block schematic of an exemplary network node 415, in accordance with certain embodiments. Network node 415 may include one or more modules. For example, network node 415 may include determining module 1710, communication module 1720, receiving module 1730, and any other suitable modules. In some embodiments, one or more of determining module 1710, communication module 1720, receiving module 1730, or any other suitable module may be implemented using processing circuitry, such as processing circuitry 1420 described above in relation to FIG. 14. In certain embodiments, the functions of two or more of the various modules may be combined into a single module. Network node 415 may perform the methods for controlling interruption level with RSSI-based measurements described above with respect to FIGS. 1-12.

Determining module 1710 may perform the processing functions of network node 415. For example, determining module 1710 may determine a CA configuration for a wireless device. As another example, determining module 1710 may obtain, based on the determined CA configuration, an allowed interruption level on a first carrier frequency. As still another example, determining module 1710 may control, for the wireless device, one or more configuration parameters to control an amount of interruption on the first carrier frequency to meet the obtained allowed interruption level. As yet another example, determining module 1710 may configure, based on the controlled one or more configuration parameters, the wireless device with a RSSI-based measurement on one of the first carrier frequency and a second carrier frequency, and at least one other measurement. Determining module 1710 may include or be included in processing circuitry, such as processing circuitry 1420 described above in relation to FIG. 14. Determining module 1710 may include analog and/or digital circuitry configured to perform any of the functions of determining module 1710 and/or processing circuitry 1420 described above. The functions of determining module 1710 may, in certain embodiments, be performed in one or more distinct modules.

Communication module 1720 may perform the transmission functions of network node 415. As one example, communication module 1720 may send, to the wireless device, a parameter related to the obtained allowed interruption level to allow the wireless device to further control the interruption level. Communication module 1720 may transmit messages to one or more of wireless devices 410. Communication module 1720 may include a transmitter and/or a transceiver, such as transceiver 1410 described above in relation to FIG. 14. Communication module 1720 may include circuitry configured to wirelessly transmit messages and/or signals. In particular embodiments, communication module 1720 may receive messages and/or signals for transmission from determining module 1710 or any other module. The functions of communication module 1720 may, in certain embodiments, be performed in one or more distinct modules.

Receiving module 1730 may perform the receiving functions of network node 415. For example, receiving module 1730 may obtain, based on the determined CA configuration, an allowed interruption level on a first carrier frequency. Receiving module 1730 may receive any suitable information from a wireless device. Receiving module 1730 may include a receiver and/or a transceiver, such as transceiver 1410 described above in relation to FIG. 14. Receiving module 1730 may include circuitry configured to wirelessly receive messages and/or signals. In particular embodiments, receiving module 1730 may communicate received messages and/or signals to determining module 1710 or any other suitable module. The functions of receiving module 1730 may, in certain embodiments, be performed in one or more distinct modules.

Determining module 1710, communication module 1720, and receiving module 1730 may include any suitable configuration of hardware and/or software. Network node 415 may include additional modules beyond those shown in FIG. 17 that may be responsible for providing any suitable functionality, including any of the functionality described above and/or any additional functionality (including any functionality necessary to support the various solutions described herein).

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
3GPP Third Generation Partnership Project
ACK Acknowledgement
AGC Automatic Gain Control
AP Access Point
BS Base Station
BSC Base Station Controller
BTS Base Transceiver Station
CA Carrier Aggregation
CC Component Carrier
CDM Code Division Multiplexing
CPE Customer Premises Equipment
CRS Common Reference Signal
CQI Channel Quality Indicator
CSI Channel State Information
CSI-RS Channel State Information Reference Symbol
D2D Device-to-device
DAS Distributed Antenna System
DC Dual Connectivity
DCI Downlink Control Information
DFT Discrete Fourier Transform
DL Downlink
DMRS Demodulation Reference Signal
DMTC Discovery Signals Measurement Timing Configuration
DRS Discovery Reference Symbol
DRX Discontinuous Reception
EARFCN E-UTRA Absolute Radio-Frequency Channel Number
E-CID Enhanced Cell Identity
eNB evolved Node B EPDCCH Enhanced Physical Downlink Control Channel
FDD Frequency Division Duplex
HSPA High Speed Packet Access
HS-SCCH High Speed Shared Control Channel
LAA Licensed-Assisted Access
LAN Local Area Network
LBT Listen-Before-Talk
LEE Laptop Embedded Equipment
LME Laptop Mounted Equipment
LTE Long Term Evolution
M2M Machine-to-Machine
MAC Medium Access Control
MAN Metropolitan Area Network
MC Multi-Connectivity
MCE Multi-cell/multicast Coordination Entity
MCS Modulation level and coding scheme
MeNB Master eNB
MSR Multi-standard Radio
NACK Negative Acknowledgement
NAS Non-Access Stratum
NZP Non-Zero Power
OCC Orthogonal Cover Code
OFDM Orthogonal Frequency Division Multiplexing
OTDOA Observed Time Difference of Arrival
PA Power Amplifier
PCC Primary Component Carrier
PCell Primary Cell
PDCCH Physical Downlink Control Channel
PDSCH Physical Downlink Shared Channel
PMI Precoded Matrix Indicator
PRB Physical Resource Block
PRS Positioning Reference Signal
PSCell Primary Serving Cell
PSS Primary Synchronization Sequence
PSTN Public Switched Telephone Network
PUSCH Physical Uplink Shared Channel
PUCCH Physical Uplink Control Channel
RF Radio Frequency
RLM Radio Link Monitoring
RNC Radio Network Controller
RRC Radio Resource Control
RRH Remote Radio Head
RRU Remote Radio Unit
RSRP Reference Signal Received Power
RSRQ Reference Signal Received Quality
RSSI Received Signal Strength Indicator
RSTD Reference Signal Time Difference
RX-TX Receive-Transmit
SCC Secondary Component Carrier
SCell Secondary Cell
SeNB Secondary eNB
SINR Signal to Interference plus Noise Ratio
SIR Signal to Interference Ratio
SNR Signal to Nosie Ratio
SRS Sounding Reference Signal
SSC Secondary Serving Cell
SSS Secondary Synchronization Sequence
TTI Transmission Time Interval
UCI Uplink Control Information
UE User Equipment
UL Uplink
WAN Wide Area Network

The invention claimed is:

1. A method in a wireless device, comprising:
determining a carrier aggregation configuration for the wireless device;
obtaining, based on the determined carrier aggregation configuration for the wireless device, an allowed interruption level on a first carrier frequency;
receiving, from a network node, a Received Signal Strength Indicator (RSSI) configuration, for an RSSI-based measurement, the RSSI-based measurement comprising an RSSI for Licensed-Assisted Access, LAA, a channel occupancy measurement for the LAA, or a WiFi RSSI, on one of the first carrier frequency and a second carrier frequency, wherein at least the second carrier frequency is comprised in unlicensed spectrum; and
controlling one or more configuration parameters to control an amount of interruption on the first carrier frequency to meet the obtained allowed interruption level,
wherein the controlled one or more configuration parameters comprise one or more of:
a time offset delta between an RSSI window on the first carrier frequency and a measurement occasion on the second carrier frequency, wherein the time offset delta is controlled to be within a first threshold;
a time offset delta between an RSSI window on the second carrier frequency and a measurement occasion on the first carrier frequency, wherein the time offset delta is controlled to be within a second threshold.

2. The method of claim 1, wherein:
the obtained allowed interruption level on the first carrier frequency is an allowed interruption level for an RSSI-based measurement on the first carrier frequency;
the received RSSI configuration is an RSSI configuration for the RSSI-based measurement on the first carrier frequency; and
controlling one or more configuration parameters to control an amount of interruption to meet the obtained allowed interruption level comprises controlling one or more of:
at least one configuration parameter for a pattern-based measurement on the second carrier frequency;
at least one RSSI configuration parameter for an RSSI-based measurement on the second carrier frequency; and
at least one RSSI configuration parameter for the RSSI-based measurement on the first carrier frequency.

3. The method of claim 2, comprising one or more of:
sending, to another node, a result of the RSSI-based measurement on the first carrier frequency; and
using the result of the RSSI-based measurement on the first carrier frequency for one or more operational tasks.

4. The method of claim 1, wherein:
the received RSSI configuration is an RSSI configuration for an RSSI-based measurement on the second carrier frequency; and
controlling one or more configuration parameters to control an amount of interruption to meet the obtained allowed interruption level comprises controlling one or more of:
at least one configuration parameter for a pattern-based measurement on the first carrier frequency; and
at least one RSSI configuration parameter for an RSSI-based measurement on the second carrier frequency.

5. The method of claim 1, comprising: indicating, to another node, an experienced interruption level at the wireless device.

6. The method of claim 5, wherein the experienced interruption level at the wireless device comprises one or more of:
an experienced interruption level at the wireless device during the RSSI-based measurement on the first carrier frequency; and
an experienced interruption level on the first carrier frequency at the wireless device due to the RSSI-based measurement on the second carrier frequency.

7. The method of claim 1, wherein the controlled one or more configuration parameters further comprise one or more of:
a measurement cycle configuration parameter;
an activation status of one or more serving cells;
a deactivation status of one or more serving cells;
a carrier aggregation configuration parameter;
a positioning reference signal (PRS) configuration parameter;
a discovery signal measurement configuration parameter; and
a sounding reference signal (SRS) configuration parameter.

8. The method of claim 1, wherein:
the first carrier frequency comprises one of a primary component carrier and an activated secondary component carrier; and
the second carrier frequency comprises a deactivated secondary component carrier.

9. The method of claim 1, wherein the carrier aggregation configuration comprises one or more of:
a set of component carriers;
a set of serving cells; an activation status of one or more serving cells;
a deactivation status of one or more serving cells; a measurement cycle configuration;
a system bandwidth on a component carrier;
a measurement bandwidth on the component carrier; and
a type of carrier aggregation.

10. A method in a network node, comprising:
determining a carrier aggregation configuration for a wireless device;
obtaining, based on the determined carrier aggregation configuration, an allowed interruption level on a first carrier frequency;
controlling, for the wireless device, one or more configuration parameters to control an amount of interruption on the first carrier frequency to meet the obtained allowed interruption level, wherein the controlled one or more configuration parameters comprise one or more of:
a time offset delta between an RSSI window on the first carrier frequency and a measurement occasion on the second carrier frequency, wherein the time offset delta is controlled to be within a first threshold;
a time offset delta between an RSSI window on the second carrier frequency and a measurement occasion on the first carrier frequency, wherein the time offset delta is controlled to be within a second threshold; and
configuring, based on the controlled one or more configuration parameters, the wireless device with a Received Signal Strength Indicator (RSSI)-based measurement, the RSSI-based measurement comprising an RSSI for Licensed-Assisted Access (LAA), a channel occupancy measurement for LAA, or a WiFi RSSI, on one of the first carrier frequency and a second carrier frequency, wherein at least the second carrier frequency is comprised in unlicensed spectrum, and at least one other measurement.

11. The method of claim 10, wherein:
the obtained allowed interruption level on the first carrier frequency is an allowed interruption level for an RSSI-based measurement on the first carrier frequency;
the controlled one or more configuration parameters comprise one or more of: at least one configuration parameter for a pattern-based measurement on the second carrier frequency;
at least one RSSI configuration parameter for an RSSI-based measurement on the second carrier frequency; and
at least one RSSI configuration parameter for the RSSI-based measurement on the first carrier frequency;
the configured RSSI-based measurement is the RSSI-based measurement on the first carrier frequency; and
the configured at least one other measurement is one of:
the pattern-based measurement on the second carrier frequency; and
the RSSI-based measurement on the second carrier frequency.

12. The method of claim 10, wherein:
the controlled one or more configuration parameters comprise one or more of:
at least one configuration parameter for a pattern-based measurement on the first carrier frequency; and
at least one RSSI configuration parameter for an RSSI-based measurement on the second carrier frequency;
the configured RSSI-based measurement is an RSSI-based measurement on the second carrier frequency; and
the configured at least one other measurement is the pattern-based measurement on the first carrier frequency.

13. The method of claim 10, comprising:
sending, to the wireless device, a parameter related to the obtained allowed interruption level to allow the wireless device to further control the interruption level.

14. The method of claim 10, wherein the controlled one or more configuration parameters further comprise one or more of:
a measurement cycle configuration parameter;
an activation status of one or more serving cells;
a deactivation status of one or more serving cells;
a carrier aggregation configuration parameter;
a positioning reference signal (PRS) configuration parameter;
a discovery signal measurement configuration parameter; and
a sounding reference signal (SRS) configuration parameter.

15. The method of claim 10, wherein:
the first carrier frequency comprises one of a primary component carrier and an activated secondary component carrier; and
the second carrier frequency comprises a deactivated secondary component carrier.

16. A wireless device, comprising:
processing circuitry, the processing circuitry configured to:
determine a carrier aggregation configuration for the wireless device;
obtain, based on the determined carrier aggregation configuration for the wireless device, an allowed interruption level on a first carrier frequency;

receive, from a network node, a Received Signal Strength Indicator (RSSI) configuration, for an RSSI-based measurement, the RSSI-based measurement comprising an RSSI for Licensed-Assisted Access (LAA), a channel occupancy measurement for LAA, or a WiFi RSSI, on one of the first carrier frequency and a second carrier frequency, wherein at least the second carrier frequency comprised in unlicensed spectrum; and control one or more configuration parameters to control an amount of interruption on the first carrier frequency to meet the obtained allowed interruption level, wherein the controlled one or more configuration parameters comprise one or more of:

a time offset delta between an RSSI window on the first carrier frequency and a measurement occasion on the second carrier frequency, wherein the time offset delta is controlled to be within a first threshold;

a time offset delta between an RSSI window on the second carrier frequency and a measurement occasion on the first carrier frequency, wherein the time offset delta is controlled to be within a second threshold.

17. A network node, comprising: processing circuitry, the processing circuitry configured to:

determine a carrier aggregation configuration for a wireless device; obtain, based on the determined carrier aggregation configuration, an allowed interruption level on a first carrier frequency;

control, for the wireless device, one or more configuration parameters to control an amount of interruption on the first carrier frequency to meet the obtained allowed interruption level, wherein the controlled one or more configuration parameters comprise one or more of:

a time offset delta between an RSSI window on the first carrier frequency and a measurement occasion on the second carrier frequency, wherein the time offset delta is controlled to be within a first threshold;

a time offset delta between an RSSI window on the second carrier frequency and a measurement occasion on the first carrier frequency, wherein the time offset delta is controlled to be within a second threshold; and configure, based on the controlled one or more configuration parameters, the wireless device with a Received Signal Strength Indicator (RSSI)-based measurement, the RSSI-based measurement comprising an RSSI for Licensed-Assisted Access (LAA), a channel occupancy measurement for LAA, or a WiFi RSSI, on one of the first carrier frequency and a second carrier frequency, wherein at least the second carrier frequency is comprised in unlicensed spectrum, and at least one other measurement.

* * * * *